United States Patent
Abe et al.

(10) Patent No.: US 7,502,547 B2
(45) Date of Patent: Mar. 10, 2009

(54) SIGNAL RECORDING/REPRODUCING APPARATUS AND RECORDING/REPRODUCING METHOD, SIGNAL REPRODUCING APPARATUS AND REPRODUCING METHOD, AND PROGRAM

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 949 days.

(21) Appl. No.: 10/484,132

(22) PCT Filed: May 20, 2003

(86) PCT No.: PCT/JP03/06294

§ 371 (c)(1),
(2), (4) Date: Jun. 14, 2004

(87) PCT Pub. No.: WO03/098928

PCT Pub. Date: Nov. 27, 2003

(65) Prior Publication Data

US 2004/0218896 A1    Nov. 4, 2004

(30) Foreign Application Priority Data

May 20, 2002   (JP) ............................. 2002-145263

(51) Int. Cl.
*H04N 5/91* (2006.01)
(52) U.S. Cl. ............................. 386/95; 386/88; 386/52; 386/124; 386/65; 348/465; 715/723; 707/5; 707/6; 707/104.1; 707/3
(58) Field of Classification Search ................. 386/124, 386/95, 65, 88, 52; 375/240.16, 240.01; 707/104.1, 3; 348/465
See application file for complete search history.

(56) References Cited

U.S. PATENT DOCUMENTS

| | | | | | |
|---|---|---|---|---|---|
| 5,577,191 | A | * | 11/1996 | Bonomi | 345/502 |
| 5,966,260 | A | * | 10/1999 | Ikeda et al. | 360/53 |
| 6,934,334 | B2 | * | 8/2005 | Yamaguchi et al. | 375/240.16 |

(Continued)

FOREIGN PATENT DOCUMENTS

JP        09-093588       4/1997

(Continued)

*Primary Examiner*—Thai Tran
*Assistant Examiner*—Helen Shibru
(74) *Attorney, Agent, or Firm*—Sonnenschein Nath & Rosenthal LLP

(57) ABSTRACT

This invention is a signal recording/reproducing apparatus (1) for searching for a reproduction position desired by a user from a recorded video signal and/or audio signal and reproducing the signal. The apparatus has a feature vector generating unit (30). When recording a video signal/audio signal, the feature vector generating unit (30) generates a feature vector characterizing the video signal and/or audio signal and also records this feature vector to a recording unit (10). When the recorded video signal/audio signal is reproduced, a registration unit (40) registers feature vectors near a position designated by the user, as bookmarks. When the user designates one of the bookmarks, a coincidence detecting unit (60) searches for a coincident position on the basis of the feature vector of the bookmark and the recorded feature vector, and a reproducing unit (20) starts reproduction of the video signal and/or audio signal at a reproduction position set by a reproduction point setting unit (70) on the basis of the coincident position.

31 Claims, 22 Drawing Sheets

U.S. PATENT DOCUMENTS

| | | | |
|---|---|---|---|
| 7,024,424 B1* | 4/2006 | Platt et al. | 707/102 |
| 7,248,782 B2* | 7/2007 | Kasutani | 386/69 |
| 2002/0085116 A1* | 7/2002 | Kuwano et al. | 348/465 |
| 2002/0122659 A1* | 9/2002 | McGrath et al. | 386/117 |
| 2002/0141733 A1* | 10/2002 | McGrath et al. | 386/46 |
| 2003/0169817 A1* | 9/2003 | Song et al. | 375/240.13 |
| 2004/0255249 A1* | 12/2004 | Chang et al. | 715/723 |
| 2005/0033760 A1* | 2/2005 | Fuller et al. | 707/100 |
| 2006/0143175 A1* | 6/2006 | Ukrainczyk et al. | 707/6 |
| 2008/0043848 A1* | 2/2008 | Kuhn | 375/240.16 |

FOREIGN PATENT DOCUMENTS

| | | |
|---|---|---|
| JP | 11-053785 | 2/1999 |
| JP | 2000-138886 | 5/2000 |
| JP | 2001-014790 | 1/2001 |

* cited by examiner

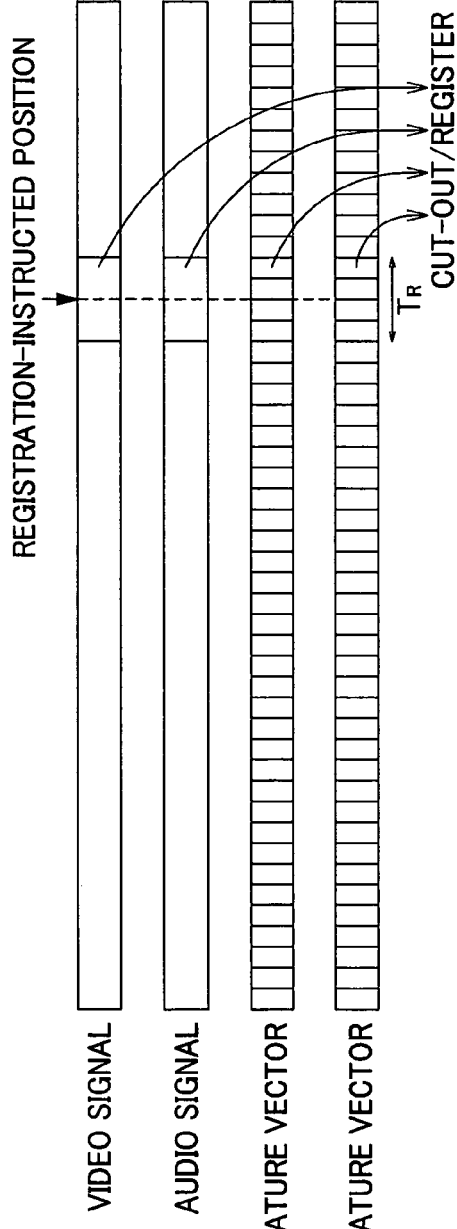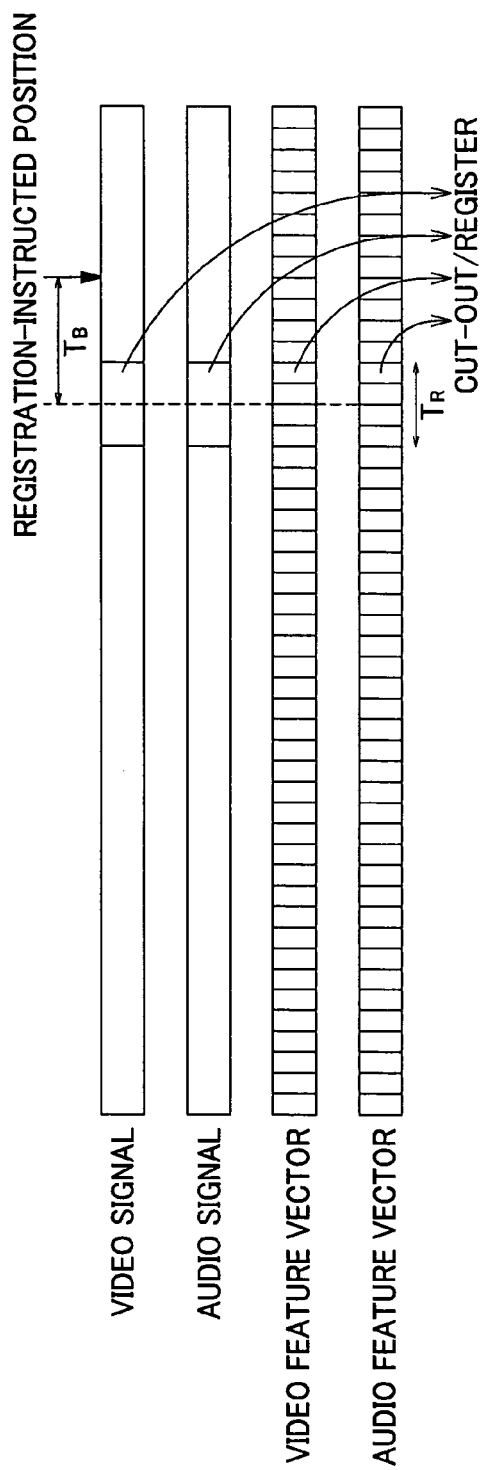

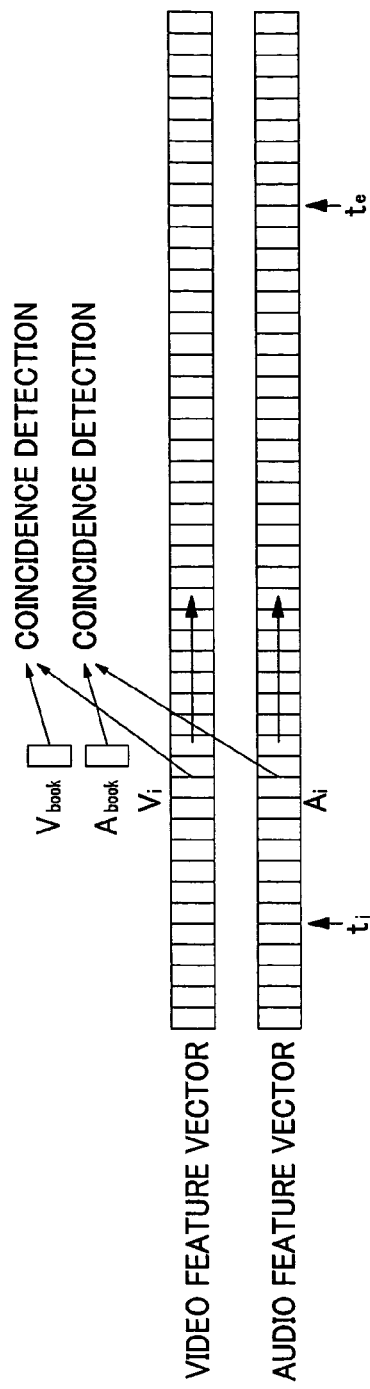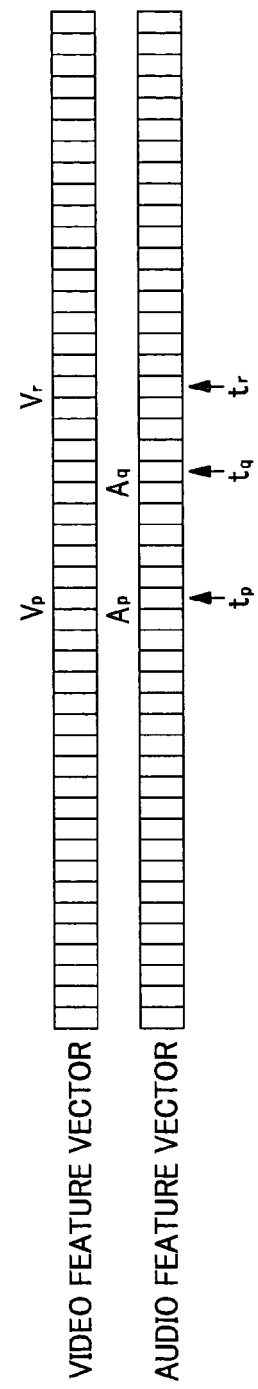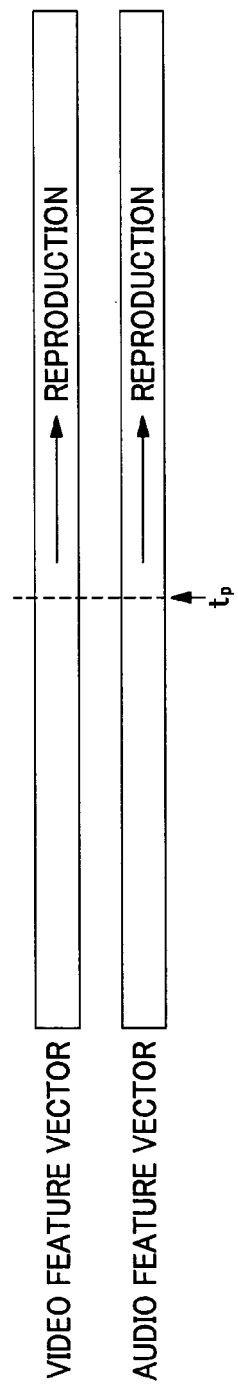

FIG.18A

| PREVIOUS PROGRAM | CM | OPENING MUSIC | NOTIFICATION OF SPONSOR | CM | MAIN PART OF PROGRAM |

FIG.18B

| PREVIOUS PROGRAM | CM | OPENING MUSIC | NOTIFICATION OF SPONSOR | CM | MAIN PART OF PROGRAM |

FIG.18C

| PREVIOUS PROGRAM | CM | MAIN PART OF PROGRAM | OPENING MUSIC | NOTIFICATION OF SPONSOR | CM | MAIN PART OF PROGRAM |

FIG.18D

| PREVIOUS PROGRAM | CM | MAIN PART OF PROGRAM | OPENING MUSIC | NOTIFICATION OF SPONSOR | CM | MAIN PART OF PROGRAM |

FIG.18E

| PREVIOUS PROGRAM | MAIN PART OF PROGRAM | OPENING MUSIC | MAIN PART OF PROGRAM |

SCHEDULED PROGRAM START TIME

VIDEO/AUDIO SIGNAL

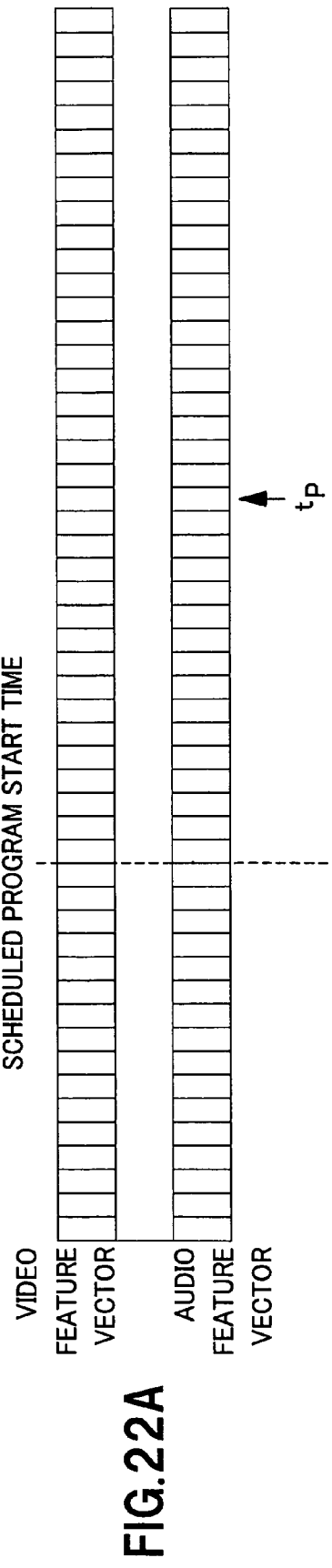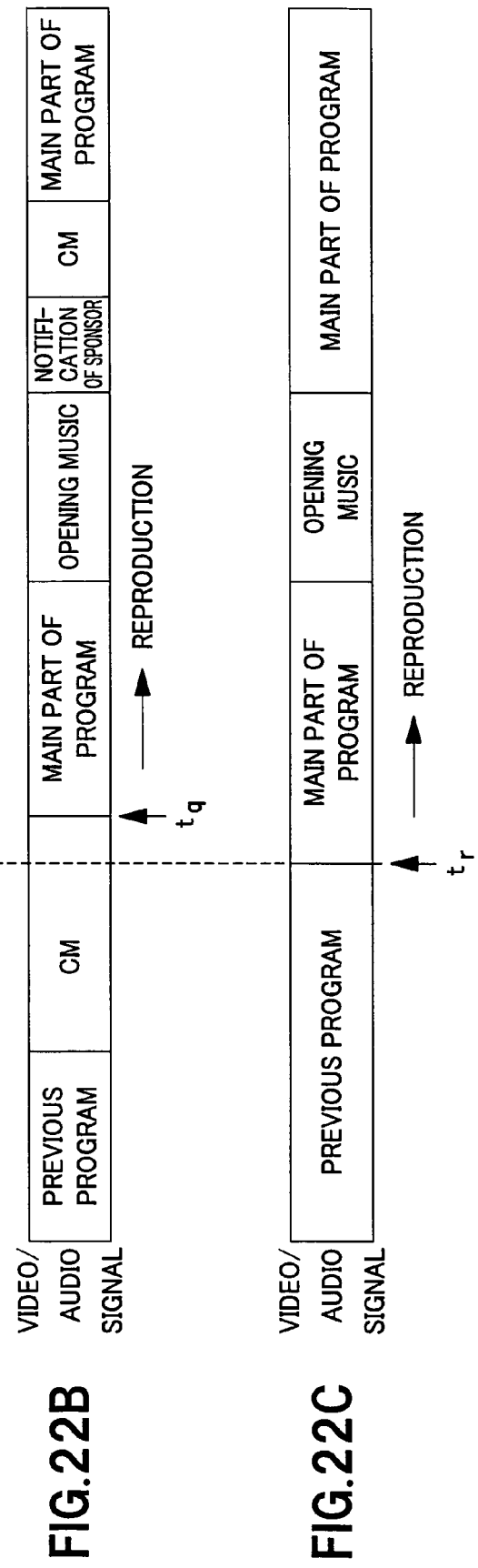

SIGNAL RECORDING/REPRODUCING APPARATUS AND RECORDING/REPRODUCING METHOD, SIGNAL REPRODUCING APPARATUS AND REPRODUCING METHOD, AND PROGRAM

BACKGROUND OF THE INVENTION

This invention relates to a signal recording/reproducing apparatus and a signal recording/reproducing method for recording and reproducing video signals and/or audio signals and for searching for a reproducing position desired by a user, a program for causing a computer to execute recording and reproduction, and a recording medium having this program recorded thereon. This invention also relates to a signal reproducing apparatus and a signal reproducing method that enable reproduction from a position desired by the user.

This application claims priority of Japanese Patent Application No.2002-145263, filed on May 20, 2002, the entirety of which is incorporated by reference herein.

Conventionally, a signal recording/reproducing apparatus such as a video recorder or a disc recorder is used to for viewing an image and listening to sound recorded from a broadcasting program, when it is convenient to the user (viewer). Since such an apparatus is provided with a fast-forward playback function and a rewind playback function, the user carries out search for the beginning of a necessary part while reproducing an unnecessary part at a high speed, and carries out normal playback of the necessary part, thereby reducing the search time.

Meanwhile, in browsing homepages on the Internet, a bookmark function and a search function are often used. The bookmark function is a mechanism that enables a user to easily register into his/her own browser a homepage that he/she browsed once in a certain way. The user can browse that page again simply by calling the bookmark. The search function is a mechanism that automatically searches for a homepage containing a part corresponding to a keyword as the user simply designates the keyword. Both mechanisms provide user assistant functions for efficiently browsing a target homepage from a very large number of homepages.

However, in video/audio search, compared with the above-described homepage search, the user needs to constantly view and listen to data during high-speed playback, and near the beginning of a target part found by search, the user may have to repeat fast-forward and rewind for alignment. This is a burden on the user. Particularly in recent years, since the recording capacity for recording images and sounds has become very large because of the advancement of recording technique, the time and burden of searching for the beginning of a necessary part have significantly increased.

Thus, it is demanded that functions similar to the bookmark function and the search function on the Internet should be added to general signal recording/reproducing apparatuses.

Specifically, if a function of appending a bookmark to an image or a sound that is being browsed, for example, by using one button on a remote controller, and searching for and reproducing a part approximately coincident with the image or sound with the bookmark by using another button, is added, it is possible to append a bookmark to an image or a sound common to a program that is broadcast several times in series, for example, title image or music, in the first broadcast, and then search for the beginning of the program at a high speed in the next broadcast and thereafter.

Although such a function can also be realized by comparing video signals or audio signals, the search time is too long and it is not a practical function. Therefore, the search time must be reduced.

SUMMARY OF THE INVENTION

In view of the foregoing status of the art, it is an object of this invention to provide a signal recording/reproducing apparatus and a signal recording/reproducing method that enable appending of a bookmark to a video signal and/or an audio signal that a user viewed or listened to once, and fast search for the video signal and/or the audio signal with the bookmark appended thereto or a video signal and/or an audio signal similar to these, a program for executing recording and reproduction, a recording medium having this program recorded thereon, and a signal reproducing apparatus and a signal reproducing method for reducing the time of searching for a position desired by the user and reproducing the data.

In order to achieve the above-described object, a signal recording/reproducing apparatus according to this invention includes: feature vector generation means for extracting a feature quantity from a video signal and/or an audio signal and forming its vector to generate a feature vector; recording means for recording the video signal and/or the audio signal and the feature vector generated by the feature vector generation means; registration means for registering at least a part of the feature vectors recorded in the recording means; coincidence detection means for detecting a feature vector substantially coincident with at least one of feature vectors registered by the registration means, from the feature vector recorded in the recording means; reproduction point setting means for setting a reproduction start point based on the detected feature vector; and reproduction means for reproducing the video signal and/or the audio signal from the reproduction start point set by the reproduction point setting means.

In this case, when reproducing the video signal and/or the audio signal recorded in the recording means, the registration means registers, for example, a feature vector corresponding to a signal position designated by a user, and the coincidence detection means detects a feature vector having a correlation value exceeding a predetermined threshold value with respect to at least one of the registered feature vectors, from the feature vectors recorded in the recording means.

In this signal recording/reproducing apparatus, when recording a video signal and/or an audio signal, also its feature vector is recorded, and when reproducing the recorded video signal and/or audio signal, for example, a feature vector corresponding to a signal position designated by the user is registered. Then, a feature vector having a correlation value exceeding a predetermined threshold value with respect to at least one of the registered features vectors is detected from the feature vector recorded in the recording means. A reproduction point is set on the basis of the detected feature vector and the video signal and/or the audio signal is reproduced from the reproduction point.

A signal recording/reproducing method according to this invention includes: a feature vector generation step of extracting a feature quantity from a video signal and/or an audio signal and forming its vector to generate a feature vector; a recording step of recording the video signal and/or the audio signal and the feature vector generated at the feature vector generation step into recording means; a registration step of registering at least a part of the feature vectors recorded in the recording means; a coincidence detection step of detecting a feature vector substantially coincident with at least one of feature vectors registered at the registration step, from the feature vector recorded in the recording means; a reproduction point setting step of setting a reproduction start point based on the detected feature vector; and a reproduction step of reproducing the video signal and/or the audio signal from the reproduction start point set at the reproduction point setting step.

In this case, at the registration step, when reproducing the video signal and/or the audio signal recorded in the recording means, for example, a feature vector corresponding to a signal position designated by a user is registered, and at the coincidence detection step, a feature vector having a correlation value exceeding a predetermined threshold value with respect to at least one of the registered feature vectors is detected from the feature vectors recorded in the recording means.

In this signal recording/reproducing method, when recording a video signal and/or an audio signal, also its feature vector is recorded, and when reproducing the recorded video signal and/or audio signal, for example, a feature vector corresponding to a signal position designated by the user is registered. Then, a feature vector having a correlation value exceeding a predetermined threshold value with respect to at least one of the registered features vectors is detected from the feature vector recorded in the recording means. A reproduction point is set on the basis of the detected feature vector and the video signal and/or the audio signal is reproduced from the reproduction point.

A program according to this invention causes a computer to execute the above-described signal recording/reproduction processing. A recording medium according to this invention is a computer-readable recording medium having such a program recorded thereon.

A signal reproducing apparatus according to this invention is adapted for reproducing a video signal and/or an audio signal recorded on a recording medium, and includes: designation means for designating a reproduction start position of the video signal and/or the audio signal; reproduction point setting means for setting a position temporally preceding the position designated by the designation means, as a reproduction start point; and reproduction means for starting reproduction of the video signal and/or the audio signal at the reproduction start point set by the reproduction point setting means.

The signal reproducing apparatus according to this invention may have commercial message detection means for detecting a commercial message in the video signal and/or in the audio signal, and the reproduction point setting means sets an end position of a commercial message temporally preceding the position designated by the designation means, as a reproduction start point.

This signal reproducing apparatus may have time detection means for detecting the time when the video signal and/or the audio signal is recorded to the recording medium, and the reproduction point setting means sets a predetermined time point temporally preceding the position designated by the designation means, for example, a start time of a program including the position designated by the designation means, or the $0^{th}$ minute of every hour, the $15^{th}$ minute of every hour or the $30^{th}$ minute of every hour, as a reproduction start point.

In this signal reproducing apparatus, when a reproduction start position of a reproduced video signal and/or audio signal is designated, a position temporally preceding the designated position is set as a reproduction start point, for example, an end position of a commercial message temporally preceding the designated position is set as a reproduction start point in the case where the commercial message detection means is provided, or a start time of a program including the designated position or the $0^{th}$ minute of every hour, the $15^{th}$ minute of every hour or the $30^{th}$ minutes of every hour is set as a reproduction start point in the case where the time detection means is provided. Reproduction of the video signal and/or the audio signal is started at the reproduction start point.

A signal reproducing method according to this invention is adapted for reproducing a video signal and/or an audio signal recorded on a recording medium, and includes: a designation step of designating a reproduction start position of the video signal and/or the audio signal; a reproduction point setting step of setting a position temporally preceding the position designated at the designation step, as a reproduction start point; and a reproduction step of starting reproduction of the video signal and/or the audio signal at the reproduction start point set at the reproduction point setting step.

The signal reproducing method according to this invention may have a commercial message detection step of detecting a commercial message in the video signal and/or in the audio signal, and at the reproduction point setting step, an end position of a commercial message temporally preceding the position designated at the designation step is set as a reproduction start point.

This signal reproducing method may have a time detection step of detecting the time when the video signal and/or the audio signal is recorded to the recording medium, and at the reproduction point setting step, a predetermined time point temporally preceding the position designated at the designation step, for example, a start time of a program including the position designated at the designation step, or the $0^{th}$ minute of every hour, the $15^{th}$ minute of every hour or the $30^{th}$ minute of every hour, is set as a reproduction start point.

In this signal reproducing method, when a reproduction start position of a reproduced video signal and/or audio signal is designated, a position temporally preceding the designated position is set as a reproduction start point, for example, an end position of a commercial message temporally preceding the designated position is set as a reproduction start point in the case where the commercial message detection step is provided, or a start time of a program including the designated position or the $0^{th}$ minute of every hour, the $15^{th}$ minute of every hour or the $30^{th}$ minutes of every hour is set as a reproduction start point in the case where the time detection step is provided. Reproduction of the video signal and/or the audio signal is started at the reproduction start point.

The other objects of this invention and specific advantages provided by this invention will be further clarified by the following description of embodiments described with reference to the drawings.

BRIEF DESCRIPTION OF THE DRAWINGS

FIGS. 13A and 13B are views for explaining cut-out processing of a video feature vector/audio feature vector in the reproduction/registration processing. FIG. 13A shows an example of cutting out a part near a registration-designated position. FIG. 13B shows an example of cutting out a vicinity position preceding the registration-designated position by a predetermined time.

FIGS. 15A to 15C are views for explaining the search processing in the signal recording/reproducing apparatus. FIG. 15A shows the search processing. FIG. 15B shows a coincident position after search. FIG. 15C shows a set reproduction position.

FIGS. 18A to 18E are views for explaining typical broadcasting patterns when broadcasting a program. FIGS. 18A to 18D show broadcasting patterns in the case where a commercial message is provided. FIG. 18E shows a broadcasting pattern in the case where no commercial message is provided.

FIGS. 22A to 22C are views for explaining examples of searching for a beginning part by a reproduction point setting unit in the signal recording/reproducing apparatus shown in FIG. 19.

DETAILED DESCRIPTION OF THE PRESENTLY PREFERRED EMBODIMENTS

Hereinafter, embodiments of this invention will be described in detail with reference to the drawings. In a first embodiment described hereinafter, this invention is applied to a signal recording/reproducing apparatus having functions of recording/reproducing a video signal and/or an audio signal and searching for a reproduction position desired by a user.

Figure 1:
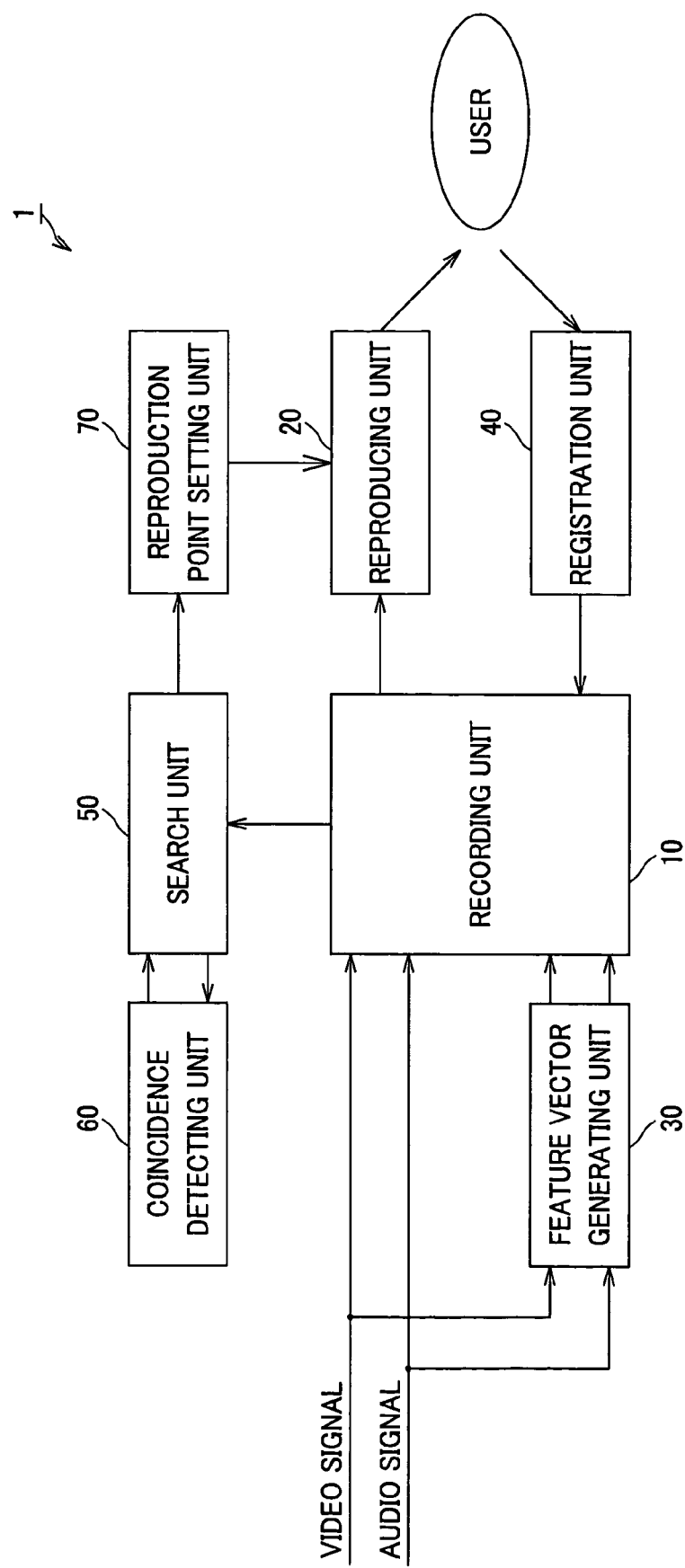
FIG. 1 is a block diagram showing a schematic structure of a signal recording/reproducing apparatus to which this invention is applied.

A signal recording/reproducing apparatus 1 to which this invention is applied has a recording unit 10, a reproducing unit 20, a feature vector generating unit 30, a registration unit 40, a search unit 50, a coincidence detecting unit 60, and a reproduction point setting unit 70, as shown in FIG. 1.

Figure 2:
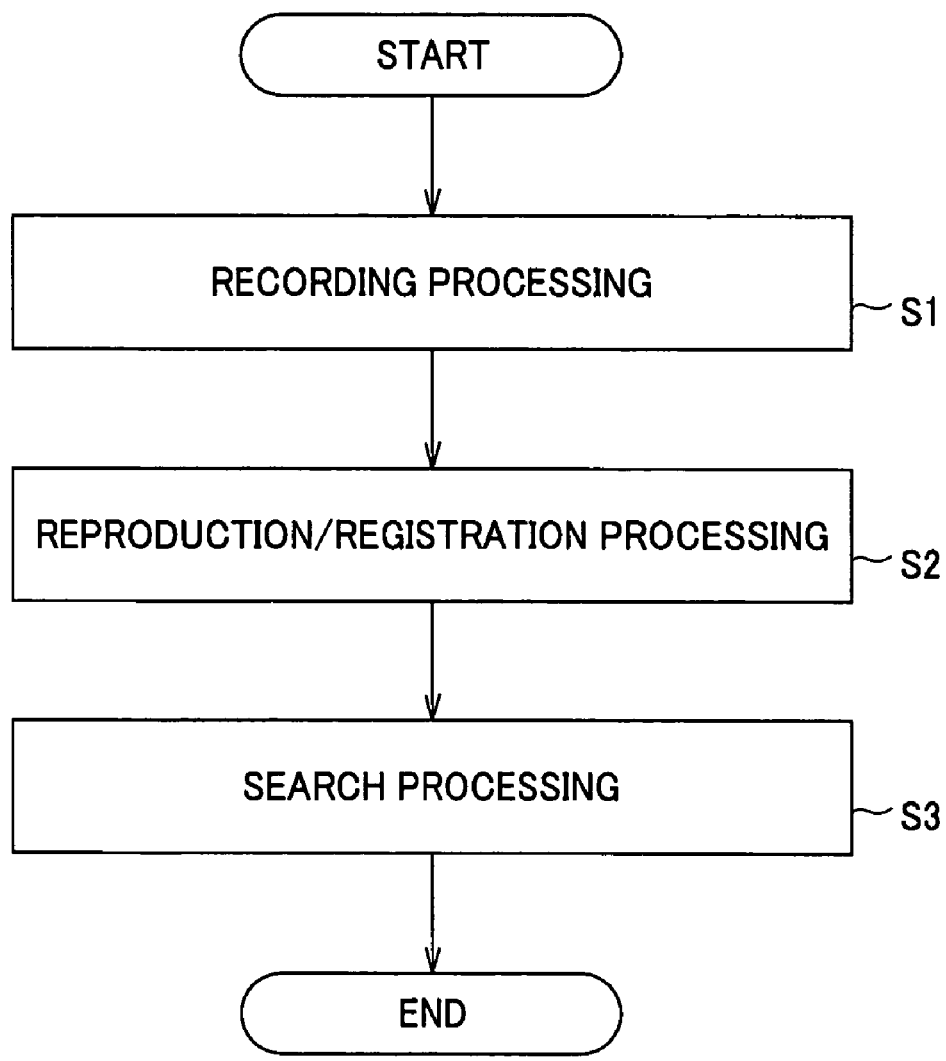
FIG. 2 is a flowchart for explaining a series of operations in the signal recording/reproducing apparatus.

A series of operations in this signal recording/reproducing apparatus 1 is classified into three steps as shown in the flowchart of FIG. 2.

Specifically, first, at step S1 in FIG. 2, recording processing to record a video signal/audio signal together with its feature quantity (feature vector) in advance is carried out. Next, at step S2, reproduction/registration processing to reproduce the recorded video signal/audio signal and to register, as a bookmark, the feature quantity near a position designated by a user in the video signal/audio signal is carried out. Next, at step S3, search processing to search the video signal/audio signal on the basis of the feature quantity of the bookmark designated by the user and to enable reproduction from a position approximately coincident with the feature quantity is carried out.

Thus, the processing of each of these steps and the operations of the individual units in the signal recording/reproducing apparatus 1 in the processing will now be described in order.

First, at step S1 in FIG. 2, the recording processing to record a video signal/audio signal together with its feature quantity (feature vector) in advance is carried out. In this recording processing, the recording unit 10 and the feature vector generating unit 30 are used.

Figure 3:
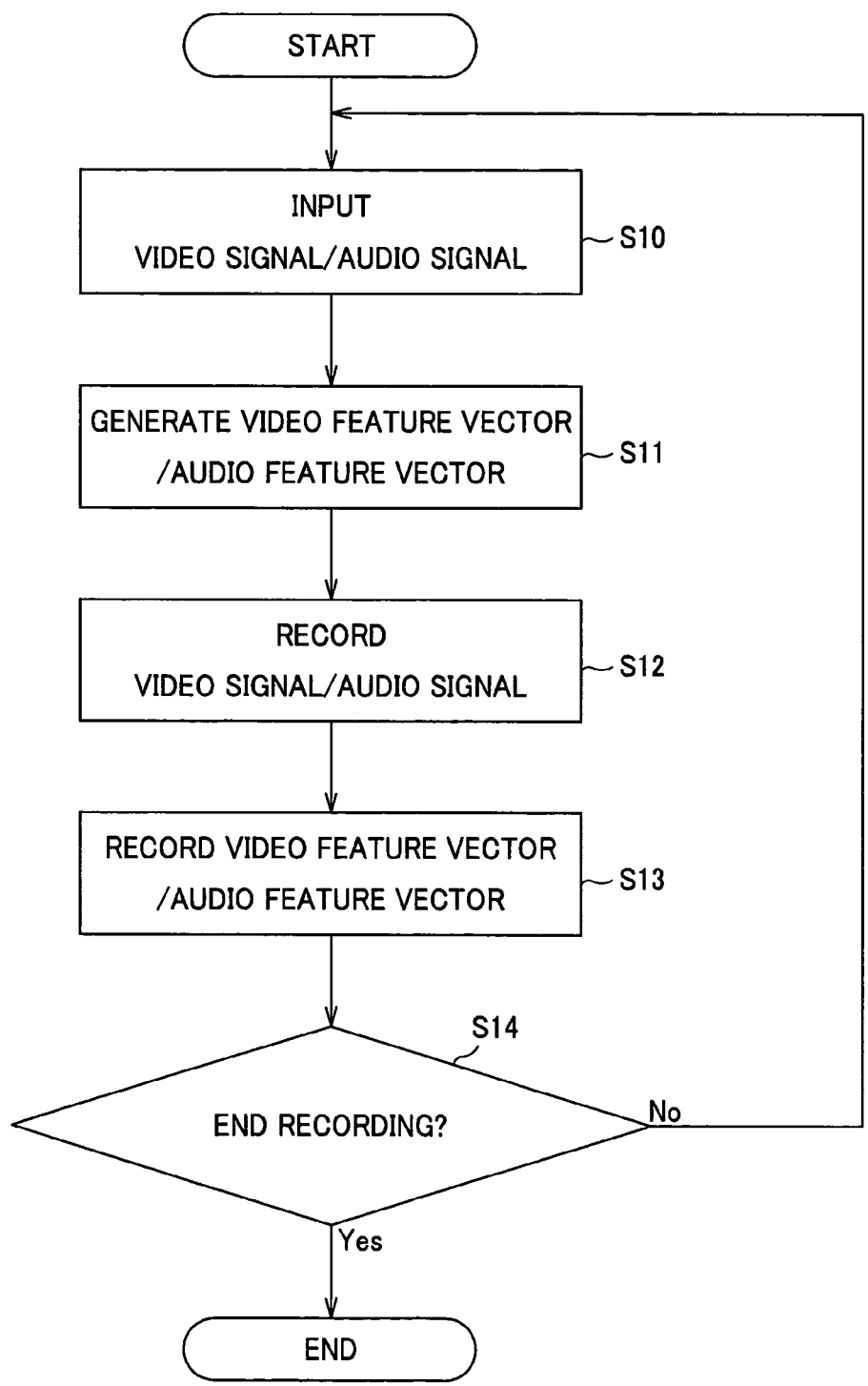
FIG. 3 is a flowchart for explaining an operation in recording processing in the signal recording/reproducing apparatus.

The operations of the individual units in the recording processing will be described with reference to the flowchart of FIG. 3. First, at step S10, the feature vector generating unit 30 input a video signal/audio signal from a tuning/demodulating device or the like, not shown. At the next step S10, the feature vector generating unit 30 generates a video feature vector and an audio feature vector in a manner which will be described later.

Next, at step S12, the video signal/audio signal is recorded into the recording unit 10. At step S13, the video feature vector and the audio feature vector are recorded into the recording unit 10. This recording unit 10 is, for example, a magnetic tape, a magnetic disk, an optical disc or the like.

At step S14, whether to end the recording or not is judged. If it is judged at step S14 that the recording is not to be ended (No), the processing returns to step S10 and the recording processing is continued. If ending of the recording is instructed by the user's operation, a timer operation or the like (Yes), the recording processing ends.

Figure 4:
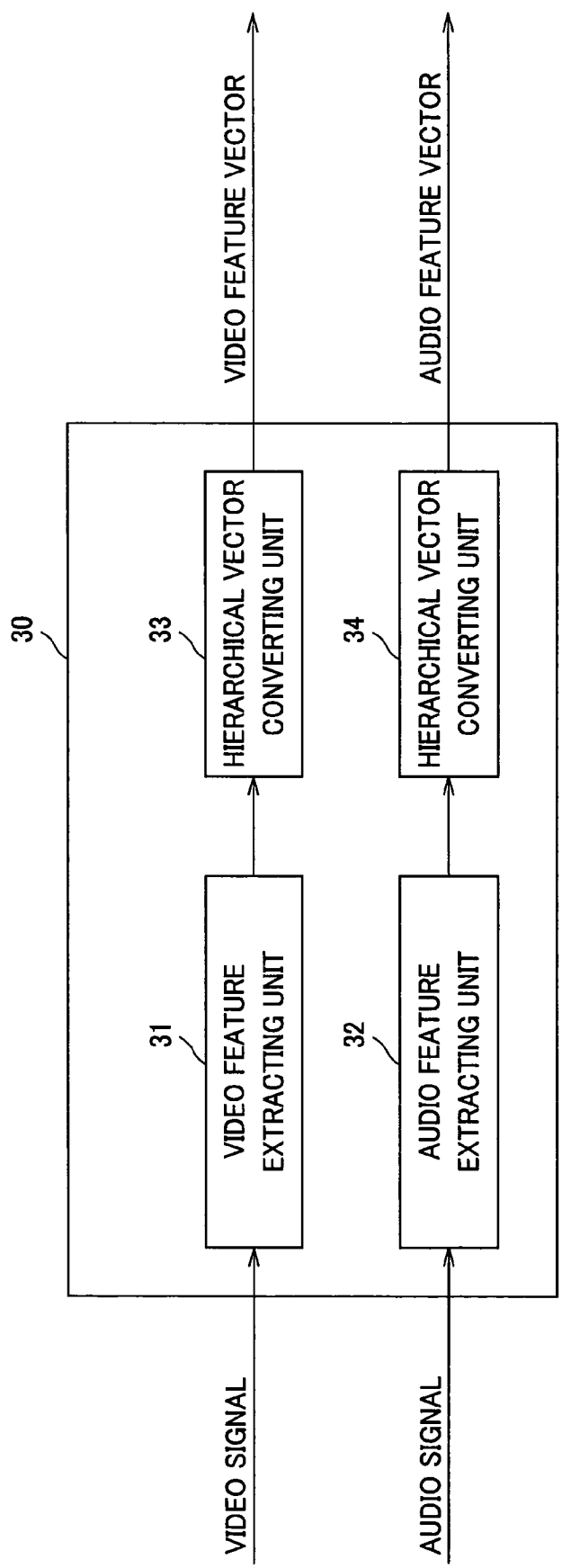
FIG. 4 is a view for explaining a detailed structure of a feature vector generating unit in the signal recording/reproducing apparatus.

FIG. 4 shows a detailed structure of the feature vector generating unit 30. As shown in FIG. 4, the feature vector generating unit 30 includes a video feature extracting unit 31, an audio feature extracting unit 32, and hierarchical vector converting units 33, 34. The two hierarchical vector converting units 33, 34 perform similar processing.

The video feature extracting unit 31 extracts a feature quantity that characterizes an image within a predetermined time interval, from an inputted video signal.

Figure 5:
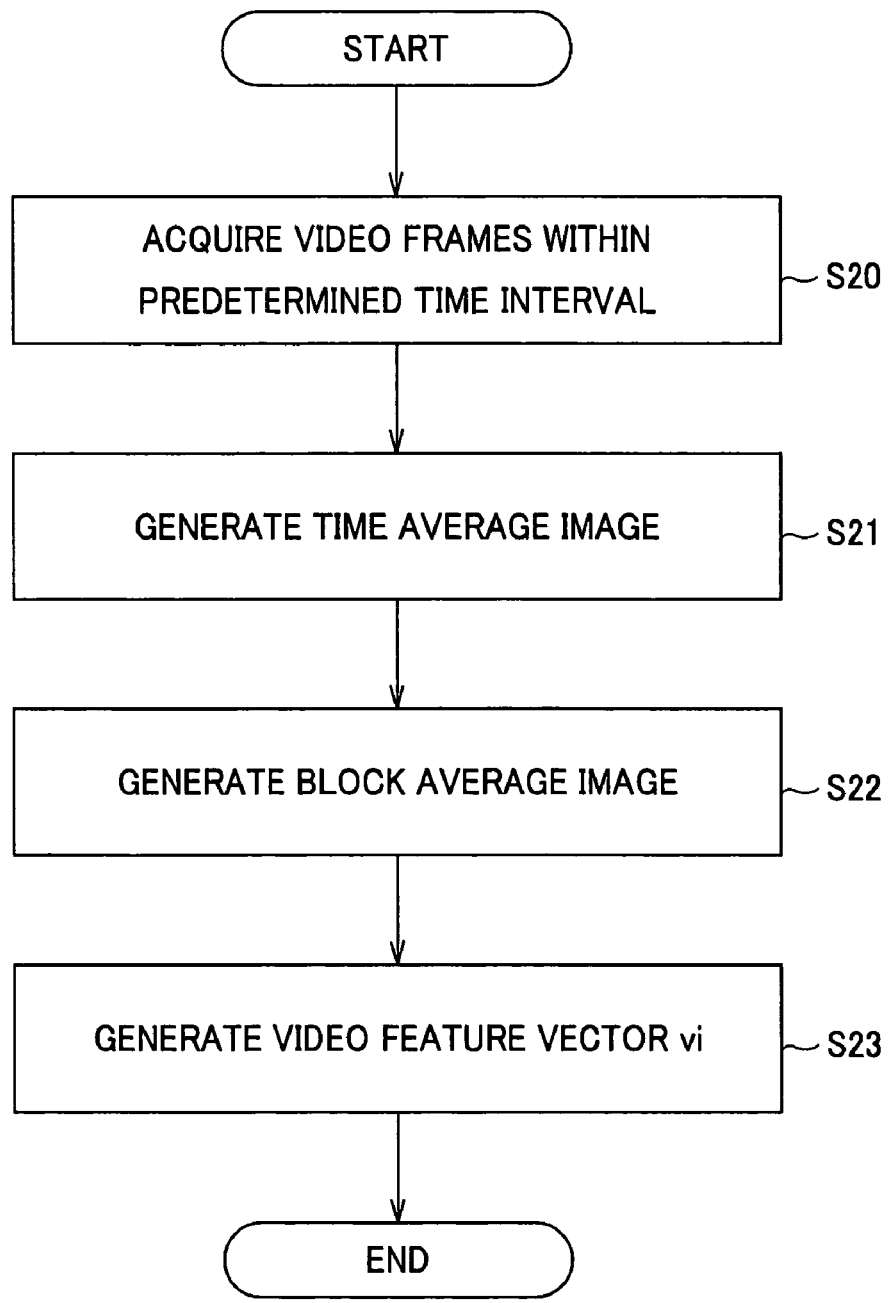
FIG. 5 is a flowchart for explaining an operation of a video feature extracting unit in the feature vector generating unit.
Figure 6:
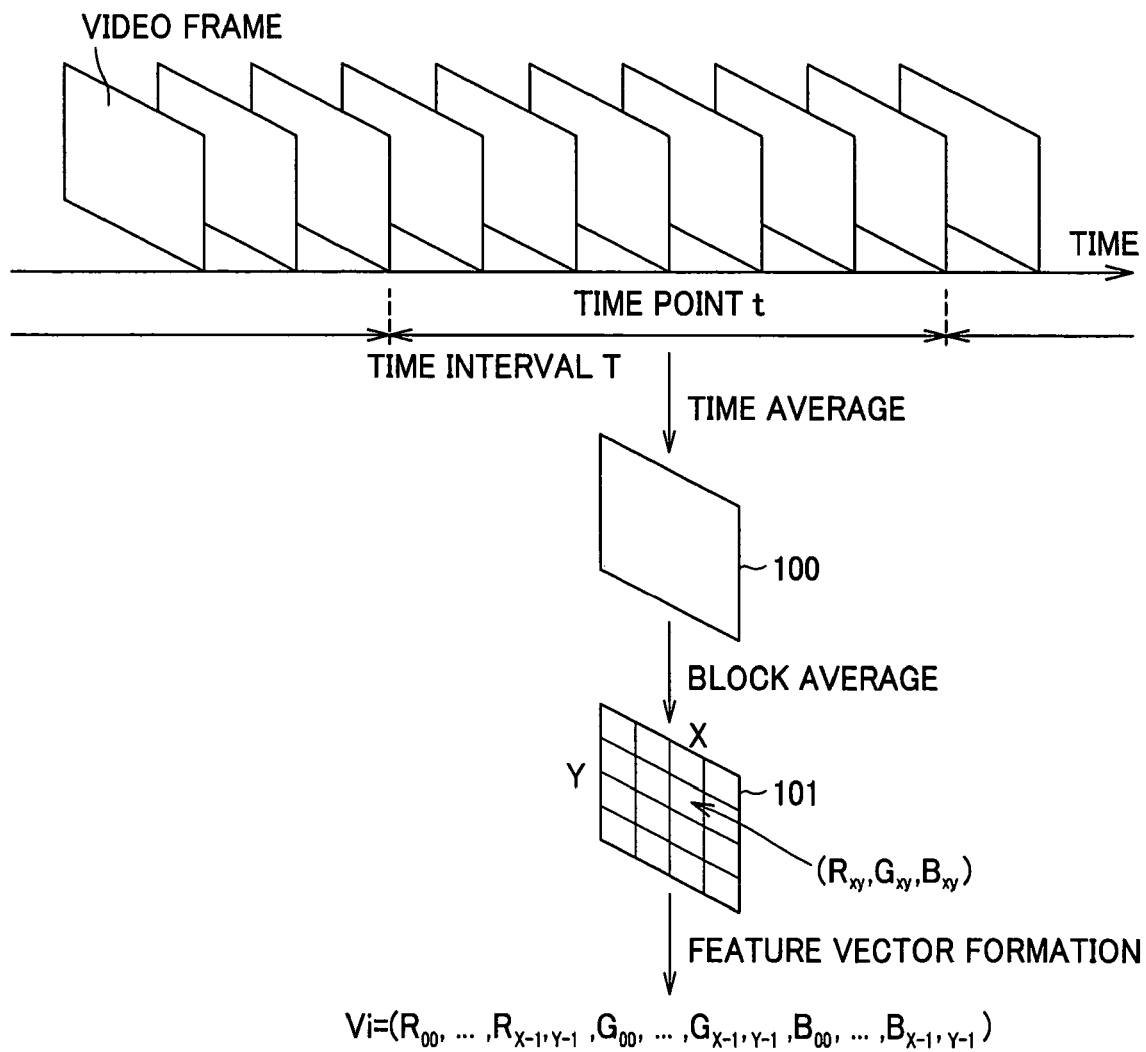
FIG. 6 is a view for explaining the operation of the video feature extracting unit.

The operation of this video feature extracting unit 31 will now be described with reference to the flowchart of FIG. 5 and FIG. 6. First, at step S20, the video feature extracting unit 31 acquires video frames within a predetermined time interval from the inputted video signal, as shown in FIG. 6.

Next, at step S21, a time average image 100 is prepared on the basis of all the acquired video frames.

Next, at step S22, the prepared time average image 100 is divided horizontally and vertically into X-by-Y small blocks and a block average image 101 having an average value of pixel values in the individual blocks is prepared.

Then, at step S23, these values are arrayed in order, for example, from the top left part to the bottom right part, thus generating a one-dimensional video feature vector vi. This video feature vector vi is expressed, for example, by the following equation (1).

$$vi=(R_{00}, \ldots, R_{X-1,Y-1}, G_{00}, \ldots, G_{X-1,Y-1}, B_{00}, \ldots, B_{X-1,Y-1}) \quad (1)$$

Since this operation is sequentially repeated with respect to an inputted video time series while time shift is performed, a time series vi (i=0, 1, . . . ) of a feature vector is sequentially generated as the video feature quantity. When performing time shift, a time interval may slightly overlap an adjacent time interval. In this case, "i" is an index representing discrete time.

In the above description, the pixel values of the block average image 101 prepared by dividing the time average image 100 are rearranged to generate the one-dimensional video feature vector vi. However, this invention is not limited to this example. It is also possible to rearrange the pixel values of the time average image 100 to generate the one-dimensional video feature vector vi without preparing the block average image 101. Moreover, the feature quantity to be extracted is not limited to the pixel value. For example, other conventionally known feature quantities that characterize an image such as edge, contour, texture and color histogram may be used.

Referring again to FIG. 4, the audio feature extracting unit 32 extracts a feature quantity that characterizes an audio signal within a predetermined time interval from an inputted audio signal.

Figure 7:
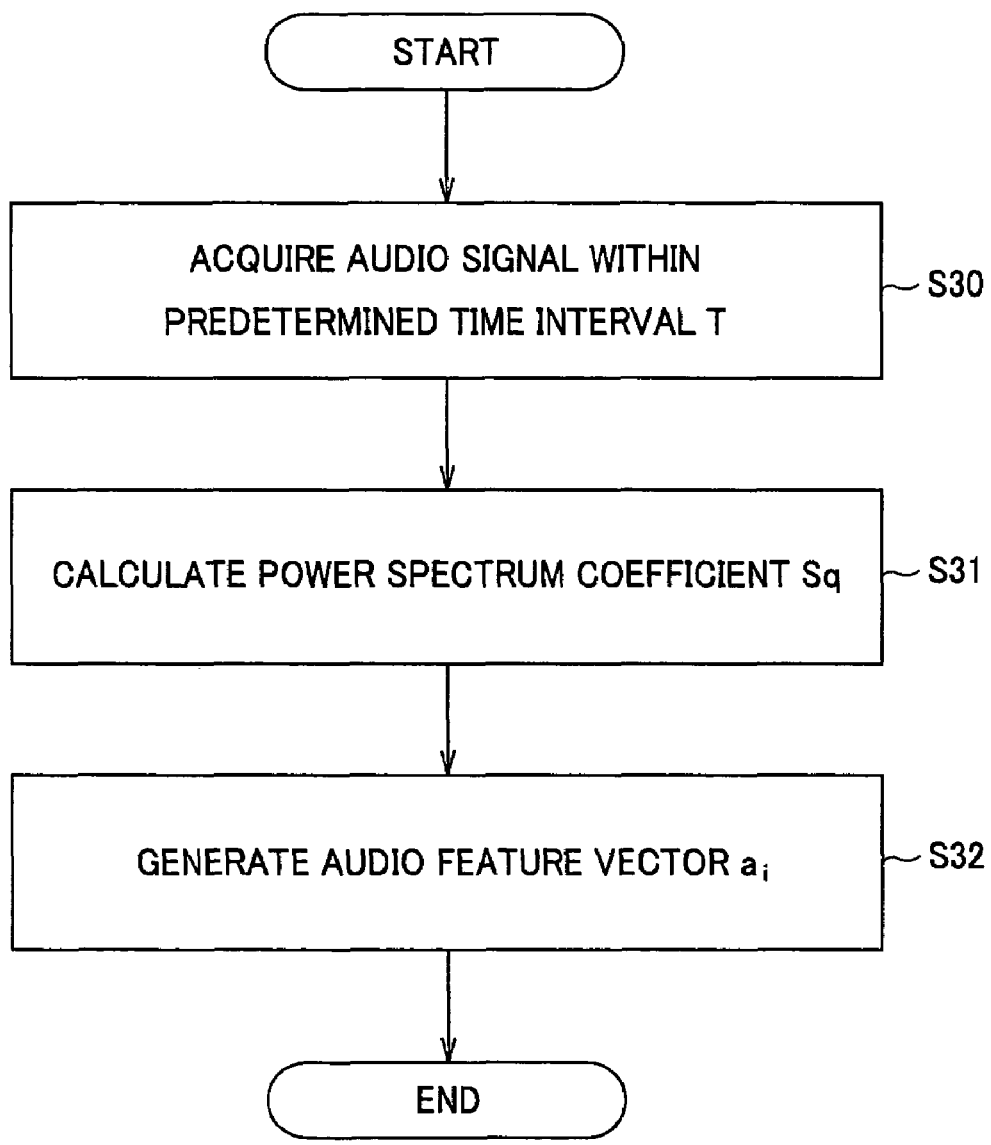
FIG. 7 is a flowchart for explaining an operation of an audio feature extracting unit in the feature vector generating unit.
Figure 8:
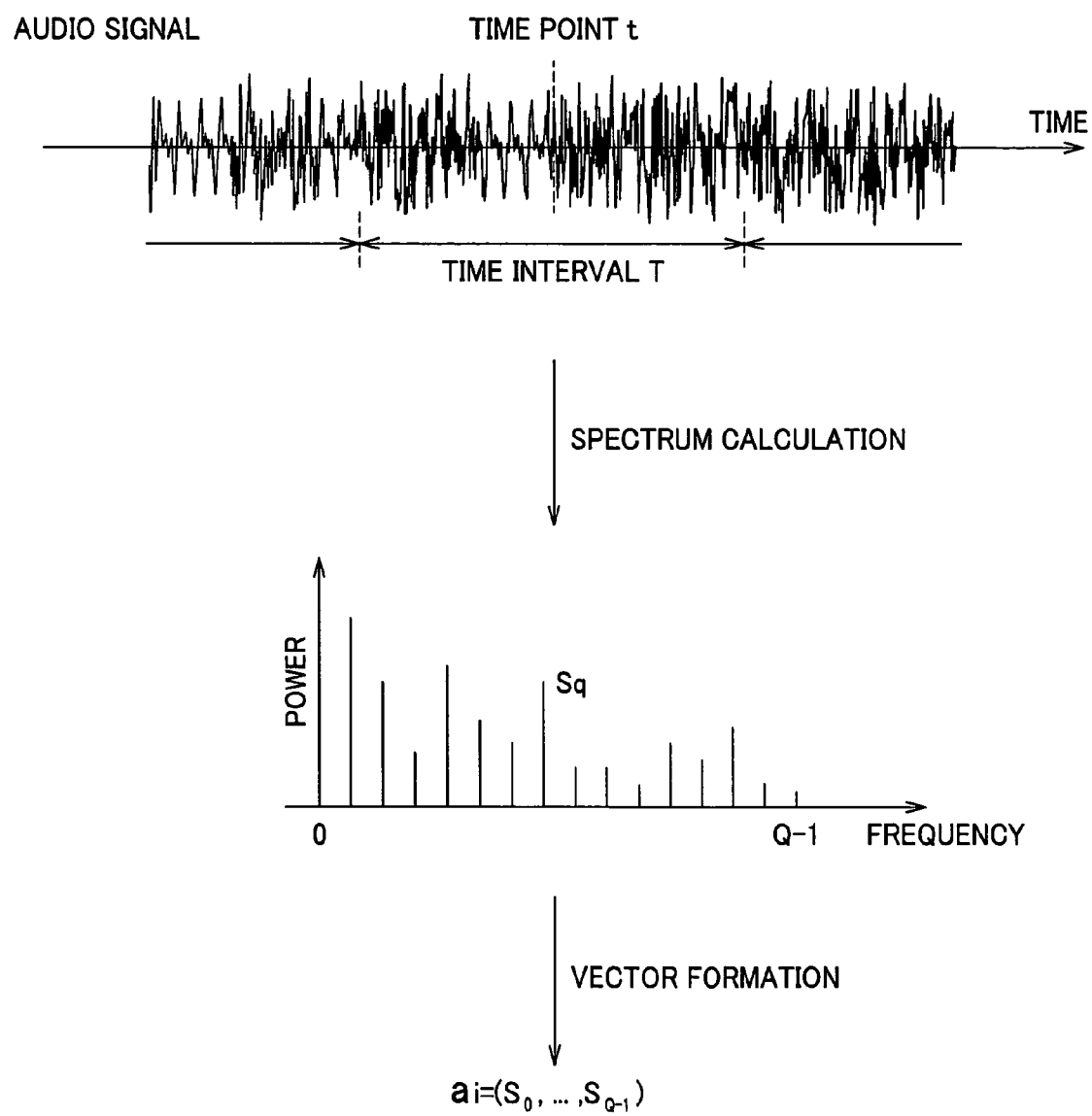
FIG. 8 is a view for explaining the operation of the audio feature extracting unit.

The operation of this audio feature extracting unit 32 will be described with reference to the flowchart of FIG. 7 and FIG. 8. First at step S30, the audio feature extracting unit 32 acquires an audio signal in a time interval of a predetermined length of time T from the inputted audio signal, as shown in FIG. 8.

Next, at step S31, spectrum calculation of the acquired audio signal is performed to find a short-time power spectrum coefficient Sq (q=0, 1, . . . , Q−1). In this case, "q" is an index representing a discrete frequency and "Q" is a maximum discrete frequency.

Next, at step S32, a vector is formed with respect to this short-time power spectrum coefficient Sq to generate an audio feature vector ai. This audio feature vector ai is expressed, for example, by the following equation (2).

$$ai=(S_0, \ldots, S_{Q-1}) \quad (2)$$

Since this operation is sequentially repeated with respect to an inputted audio signal time series while time shift is performed, a time series ai (i=0, 1, . . . ) of a feature vector is sequentially generated as the audio feature quantity. Also in this case, when performing time shift, a time interval may slightly overlap an adjacent time interval.

Although the short-time power spectrum coefficient is used in the above-described example, this invention is not limited to this example. For example, higher-order feature quantities that are conventionally known to characterize an audio signal such as pitch frequency, formant frequency, linear prediction coefficient and cepstrum coefficient may be used.

Referring again to FIG. 4, the hierarchical vector converting units 33, 34 perform hierarchical conversion of the above-described video feature vector vi and the audio feature vector ai, respectively, from the $0^{th}$ stage to the K-th (=$\log_2 N$) stage. Since the operations of the hierarchical vector converting units 33, 34 are the same except that different vectors are inputted thereto, a vector f in the following description is assumed to represent the video feature vector vi or the audio feature vector ai. It is assumed that the number of components of the vector f is N, which is a number expressed by the power of 2 such as N=$2^K$. Otherwise, the power of 2 is realized by adding 0 as vector components. Moreover, f[0], f[1] represent individual components of the vector f.

Figure 9:
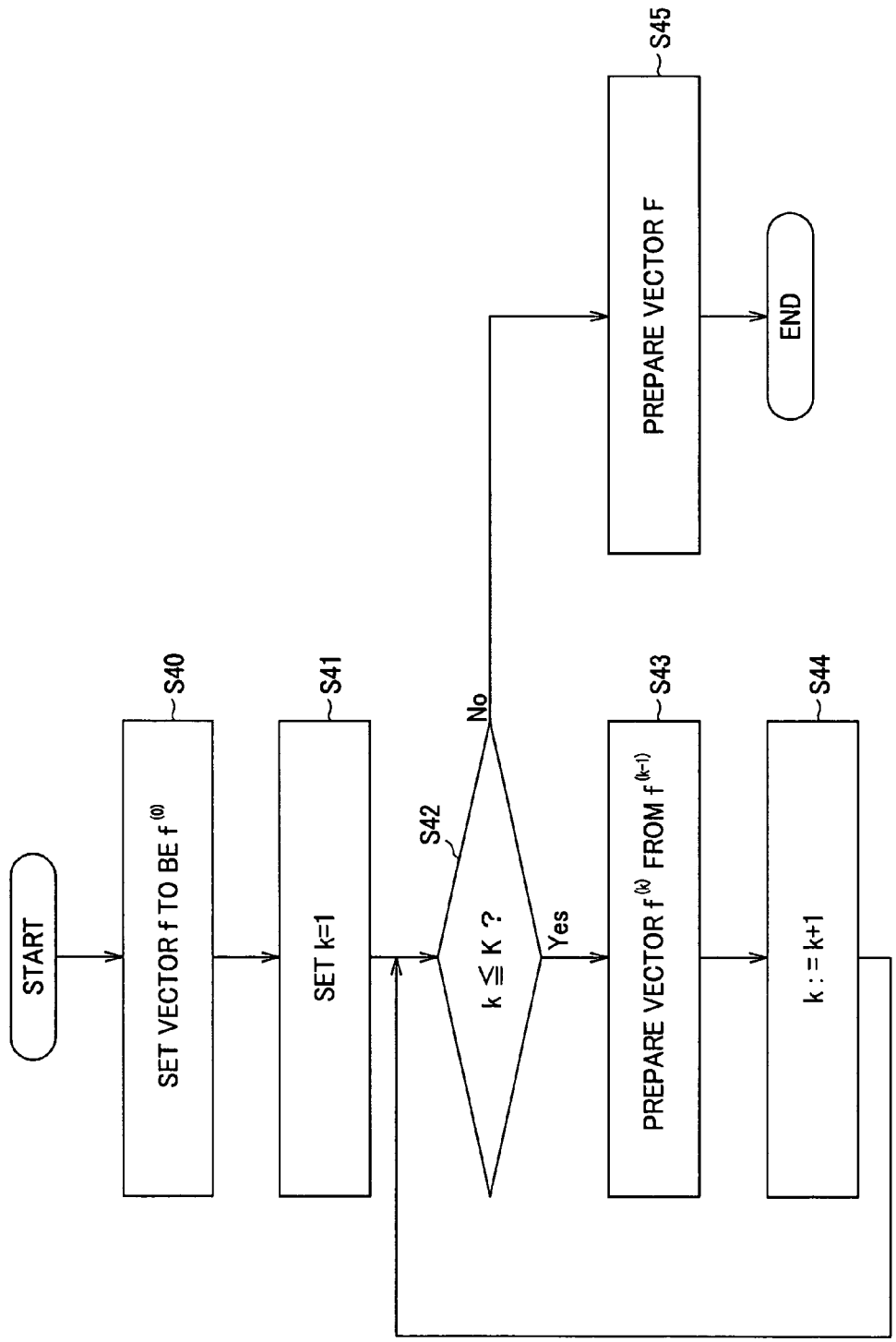
FIG. 9 is a flowchart for explaining an operation of a hierarchical conversion unit in the feature vector generating unit.

First, at step S40 in FIG. 9, the individual components of the input vector f are used as the components of the $0^{th}$ stage, as expressed by the following equation (3).

$$f^{(0)}[n]=f[n](n=0,\ldots,N-1) \quad (3)$$

Next, at step S41, k is set to be 1, and at the next step S42, whether or not k is equal to or less than K is judged. If k is equal to or less than K at step S42 (Yes), the processing goes to step S43. If k is larger K (No), the processing goes to step S45.

At step S43, the k-th elements are generated from the (k−1)th components in accordance with the following equation (4).

$$f^{(k)}[n]=(1/\sqrt{2})(f^{(k-1)}[2n]+f^{(k-1)}[2n+1])(0 \leq n<2^{K-k})f^{(k)}$$
$$[n]=(1/\sqrt{2})(f^{(k-1)}[2n-2^{K-k}]-f^{(k-1)}[2n+1-2^{K-k}])$$
$$(2^{K-k} \leq n<2^{K-k+1})f^{(k)}[n]=f^{(k-1)}[n](2^{K-k+1} \leq n<N) \quad (4)$$

This equation (4) is to calculate the sum and difference of the adjacent components of the (k−1)th stage and multiply the sum and difference by $1/\sqrt{2}$. The sum component of the adjacent components is assumed to be the n($0 \leq n<2^{K-k}$)th component, and the difference component of the adjacent components is assumed to be the n($2^{K-k} \leq n<2^{K-k+1}$)th component. However, this calculation is performed from the $0^{th}$ component to the ($2^{K-k+1}$)th component, and with respect to the other components, the components of the (k−1)th stage are used as the components of the k-th stage.

Next, at step S44, k is increased by one and the processing returns to step S42 to continue the conversion processing.

At step S45, since the generation of the components on all the stages is completed, the components acquired at the individual stages of conversion are gathered and a vector F after conversion, as expressed by the following equation (5) is generated. Then, the conversion processing ends.

$$F=(f^K[0], f^K[1], \ldots, f^K[N-1])^t \quad (5)$$

Figure 10:
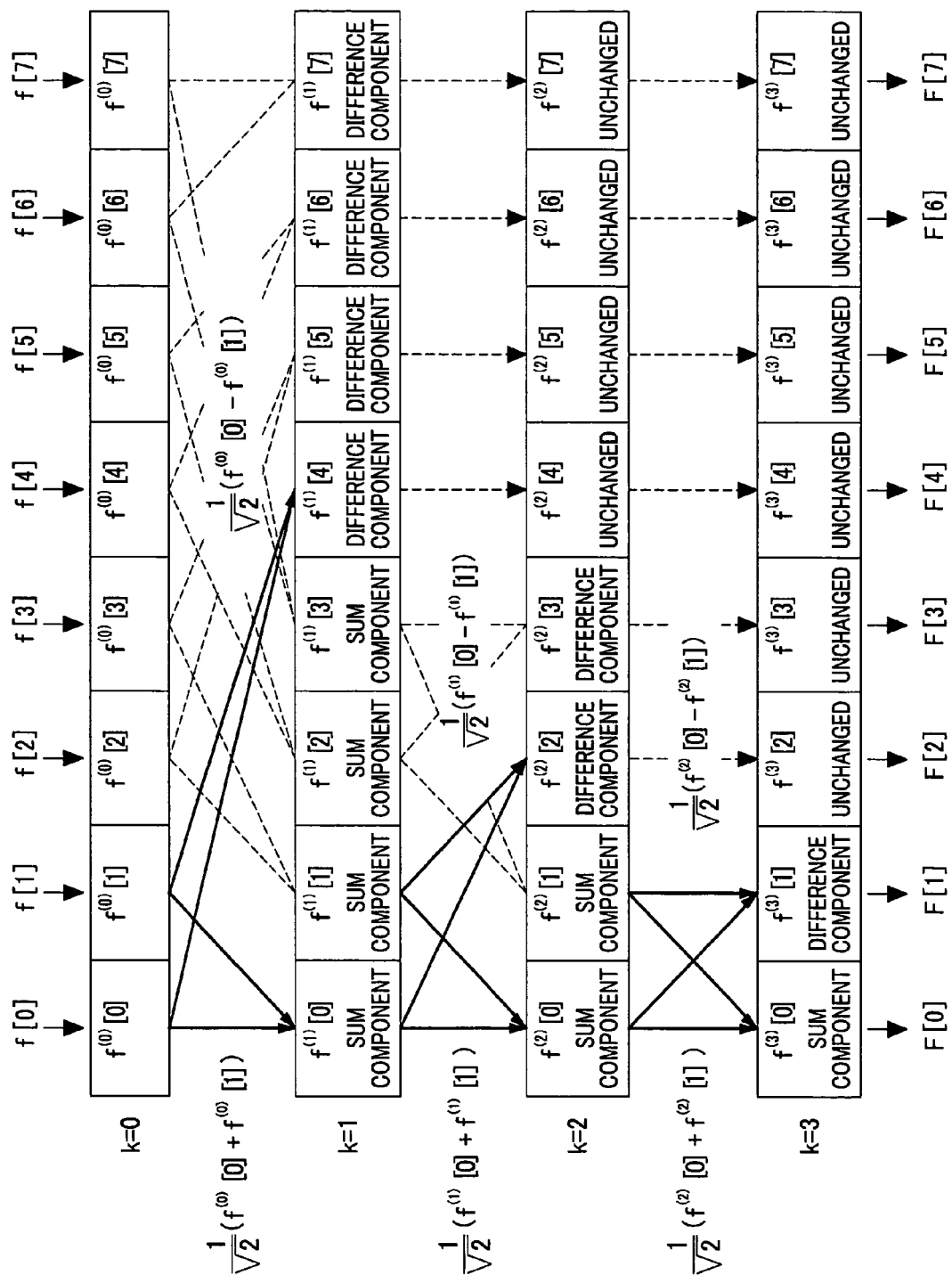
FIG. 10 is a view for explaining a specific operation of the hierarchical conversion unit.

FIG. 10 shows specific calculation, for example, in the case of N=8 =$2^3$. On the $0^{th}$ stage (k=0) of conversion, the vector f is an element of the $0^{th}$ stage.

Next, on the first stage (k=1), the sum and difference of the adjacent components are calculated with respect to all the elements of the $0^{th}$ stage and then multiplied by $1/\sqrt{2}$. The sum component is substituted into $f^{(1)}[0]$ to $f^{(1)}[3]$ and the difference components is substituted into $f^{(1)}[4]$ to $f^{(1)}[7]$.

On the second stage, with respect to the $0^{th}$ to third components, of the components of the first stage, that is, the components summed in the calculation on the first stage, the sum and difference of the adjacent components are calculated and then multiplied by $1\sqrt{2}$. The sum component is substituted into $f^{(2)}[0]$ and $f^{(2)}[1]$, and the difference component is substituted into $f^{(2)}[2]$ and $f^{(2)}[3]$. $f^{(1)}[4]$ to $f^{(1)}[7]$ are substituted into $f^{(2)}[4]$ to $f^{(2)}[7]$.

On the third stage, with respect to the $0^{th}$ and first components, of the components of the second stage, that is, the components summed in the calculation on the second stage, the sum and difference of the adjacent components are calculated and then multiplied by $1\sqrt{2}$. The sum component is substituted into $f^{(3)}[0]$ and the difference component is substituted into $f^{(3)}[1]$. $f^{(2)}[2]$ to $f^{(2)}[7]$ are substituted into $f^{(3)}[2]$ to $f^{(3)}[7]$.

Finally, $f^{(3)}[0]$ to $f^{(3)}[7]$ are substituted into F[0] to F[7] and the calculation ends.

By the above-described operation, the video feature vector vi is converted to a video feature vector Vi, and the audio feature vector ai is converted to an audio feature vector Ai.

Figure 11:
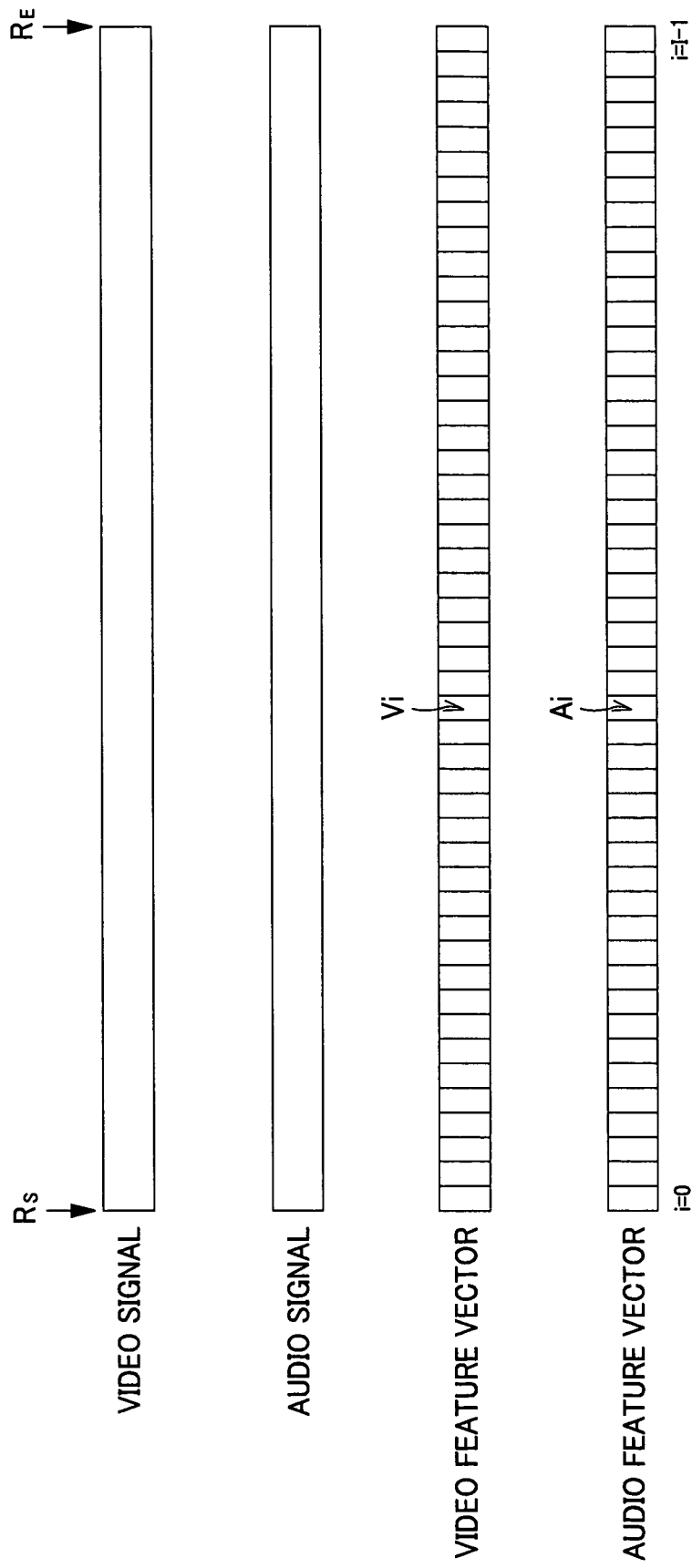
FIG. 11 is a view for explaining a signal recorded in the recording processing in the signal recording/reproducing apparatus.

The converted video feature vector Vi and the converted audio feature vector Ai are recorded together with the video signal/audio signal into the recording unit 10 (see FIG. 1). FIG. 11 schematically shows these signals to be recorded. As shown in FIG. 11, the video signal/audio signal from a recording start position $R_S$ to a recording end position $R_E$, and the video feature vector Vi and the audio feature vector Ai are recorded into the recording unit 10. These video feature vector Vi and audio feature vector Ai have been calculated for each predetermined time length T as described above. For example, I units of indexes i from 0 to I−1 representing discrete time are recorded.

Next, at step S2 in FIG. 2, the reproduction/registration processing to reproduce the recorded video signal/audio signal and register a feature quantity near a position designated by the user in the reproduced signal as a so-called bookmark is carried out. In this reproduction/registration processing, the recording unit 10, the reproducing unit 20 and the registration unit 40 are used.

Figure 12:
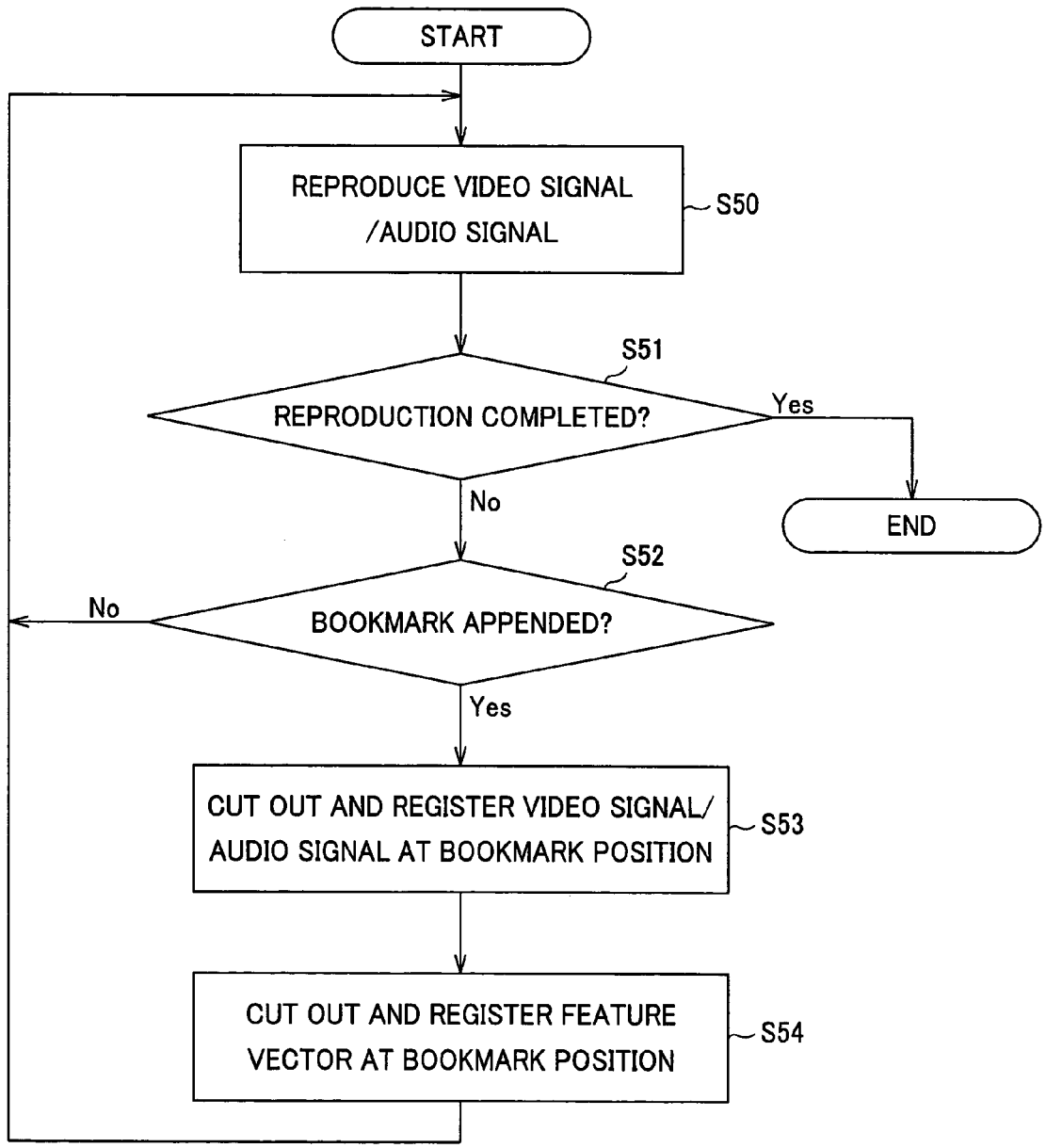
FIG. 12 is a flowchart for explaining an operation in reproduction/registration processing in the signal recording/reproduction apparatus.

The operations of the individual units in the reproduction/registration processing will now be described with reference to the flowchart of FIG. 12 and FIGS. 13A and 13B. First, at step S50, the reproducing unit 20 reproduced the video signal/audio signal on the basis of a reproduction instruction from the user.

Next, at step S51, the reproducing unit 20 judges whether or not a reproduction end instruction was made by the user. If a reproduction end instruction is made (Yes) at step S51, the reproduction ends. If a reproduction end instruction is not made (No), the processing goes to step S52.

At step S52, the registration unit 40 judges whether or not a registration instruction (bookmark) was made by the user. If a registration instruction is not made (No) at step S52, the processing returns to step S50. If a registration instruction is made (Yes), the processing goes to step S53.

At step S53, the registration unit 40 cuts out a video signal/audio signal of a predetermined length of time $T_R$ near the designated position (bookmark) and registers the signal to the recording unit 10, as shown in FIG. 13A.

At step S54, the registration unit 40 cuts out the video feature vector Vi and the audio feature vector Ai of the predetermined length of time $T_R$ near the designated position and registers the vectors to the recording unit 10, as shown in FIG. 13A. Specifically, for example, when the predetermined length of time $T_R$ is four times the predetermined length of time T (i.e., $T_R$=4T), the registration unit 40 cuts out four video feature vectors Vi and four audio feature vectors Ai and registers the vectors to the recording unit 10.

When the user adds a bookmark during reproduction, a registration instruction is usually made at a part subsequent to a position where the bookmark is to be added. Therefore, the video feature vector Vi and the audio feature vector Ai of the predetermined length of time $T_R$ around a position preceding the designated position by a predetermined time $T_B$, as shown in FIG. 13B.

As the cut-out operation and the registration operation, a video signal/audio signal and a video feature vector/audio feature vector may be actually extracted and registered from the recorded video signal/audio signal and video feature vector/audio feature vector. However, to save the storage capacity, it is possible to register only a bookmark position. In this case, if a video signal/audio signal and feature vectors are actually needed, the bookmark position can be used as a point to the actual video signal/audio signal and feature vectors. However, if the recorded video signal/audio signal is erased, it is better to actually extract and register the video signal/audio signal and feature vectors, as described above.

Next, at step S3 in FIG. 2, the search processing to search for a video signal/audio signal on the basis of the feature vectors of the bookmark designated by the user and enable reproduction from a position substantially coincident with the feature vectors is carried out. In this search processing, the recording unit 10, the search unit 50, the coincidence detecting unit 60 and the reproduction point setting unit 70 are used.

Figure 14:
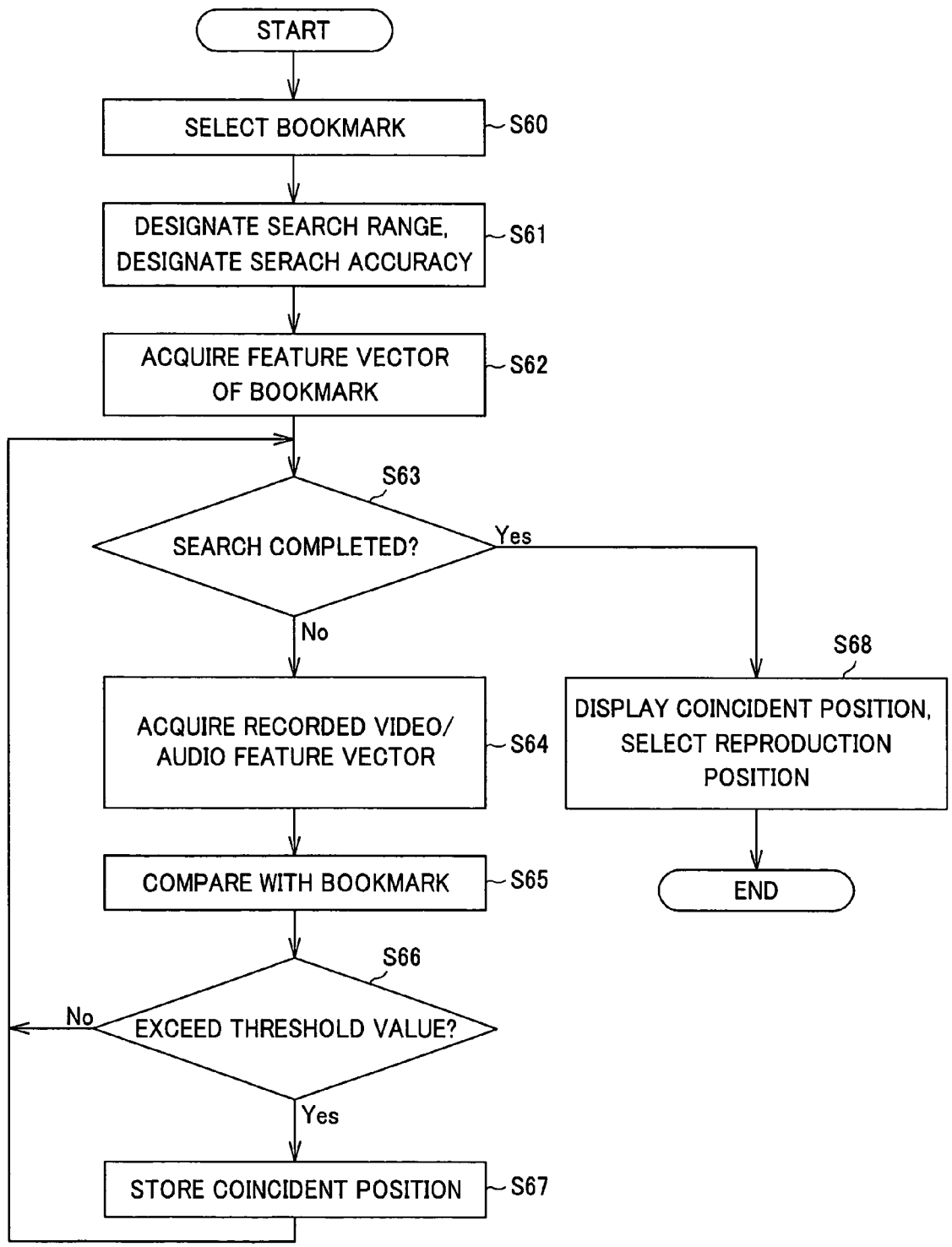
FIG. 14 is a flowchart for explaining an operation in search processing in the signal recording/reproducing apparatus.

The operations of the individual units in the search processing will now be described with reference to the flowchart of FIG. 14. When a search instruction is given by the user through a user interface, not shown, first at step S60, the search unit 50 receives selection of a registered bookmark from the user. If only one bookmark is registered, or when performing search with respect to all the registered bookmarks, or if the priority of bookmarks is set in advance, this step may be omitted.

Next, at step S61, the search unit 50 receives, from the user, designation of a search range indicating which part of the recorded video signal/audio signal should be searched, and designation of search accuracy indicating the degree of difference that can be recognized as coincident. If the search range and the search accuracy are set in advance, this step may be omitted.

Next, at step S62, the search unit 50 acquires the feature vectors of the designated bookmark from the recording unit 10. To simplify the explanation, the case of one feature vector will be described hereinafter. However, in the case where plural video feature vectors Vi and audio feature vectors Ai are registered with one bookmark, the following operation is sequentially carried out for each of these vectors.

At step S63, the search unit 50 judges whether or not the search in the designated search range has been completed. If the search has not been completed (No) at step S63, the processing goes to step S64. If the search has been completed (Yes), the processing goes to step S68.

At step S64, the search unit 50 acquires one recorded feature vector in the search range.

Next, at step S65, the coincidence detecting unit 60 compares the feature vector with the feature vector of the bookmark and calculates a correlation value between them in a manner which will be described later. At step S66, the coincidence detecting unit 60 judges whether or not the correlation value exceeds a preset threshold value. If the correlation value does not exceed the threshold value (No) at step S66, the processing returns to step S63 and comparison with another feature vector is repeated. If the correlation value exceeds the threshold value (Yes) at step S66, it is determined that the feature vectors are coincident and that position is stored at step S67. After that, the processing returns to step S63 and comparison with another feature vector is repeated. The coincidence detection by this coincidence detecting unit 60 will be later described in detail.

At step S68, the stored coincident position is displayed, and the reproduction point setting unit 70 receives designation of the position where reproduction should be started, from the user, and starts reproduction. If only one coincident position exists or if the priority of reproduction is predetermined, step S68 may be omitted and reproduction can be started. If there is no coincident position, the absence of coincident position is displayed and reproduction is not carried out.

FIGS. 15A to 15C schematically show the above-described processing. First, as shown in FIG. 15A, a video feature vector $V_{Book}$ and an audio feature vector $A_{Book}$ of a registered bookmark are compared with the recorded video feature vector Vi and audio feature vector Ai from a search start position ts where the index i representing discrete time is s to a search end position te where the index i is e.

Next, as shown in FIG. 15B, a position where coincidence with the video feature vector Vi or the audio feature vector Ai is detected is presented to the user. In the example shown in FIG. 15B, at a position tp where the index i is p, a video feature vector Vp and an audio feature vector Ap are coincident with the video feature vector $V_{Book}$ and the audio feature vector $A_{Book}$ of the bookmark, and at a position tq where the index i is q, an audio feature vector Aq is coincident with the audio feature vector $A_{Book}$ of the bookmark. At a position tr where the index i is r, a video feature vector Vr is coincident with the video feature vector $V_{Book}$ of the bookmark. Specifically, the video signal at the position where coincidence is detected is displayed, for example, by thumbnail display. As for the audio signal, it is reproduced for a while, for example, from the first position where coincidence is detected, and then a shift to the next coincident position is made in response to the user's instruction and the audio signal is reproduced for a while from that position. In the example of FIG. 15B, the position where coincidence with either the video feature vector Vi or the audio feature vector Ai is detected is presented. However, this invention is not limited to this example. It is also possible to present only the position where coincidence with both the video feature vector Vi and the audio feature vector Ai is detected.

Then, as shown in FIG. 15C, selection of a reproduction point is received from the user and reproduction is started at that point as a reproduction start point. In FIG. 15C, the position tp is selected.

Figure 16:
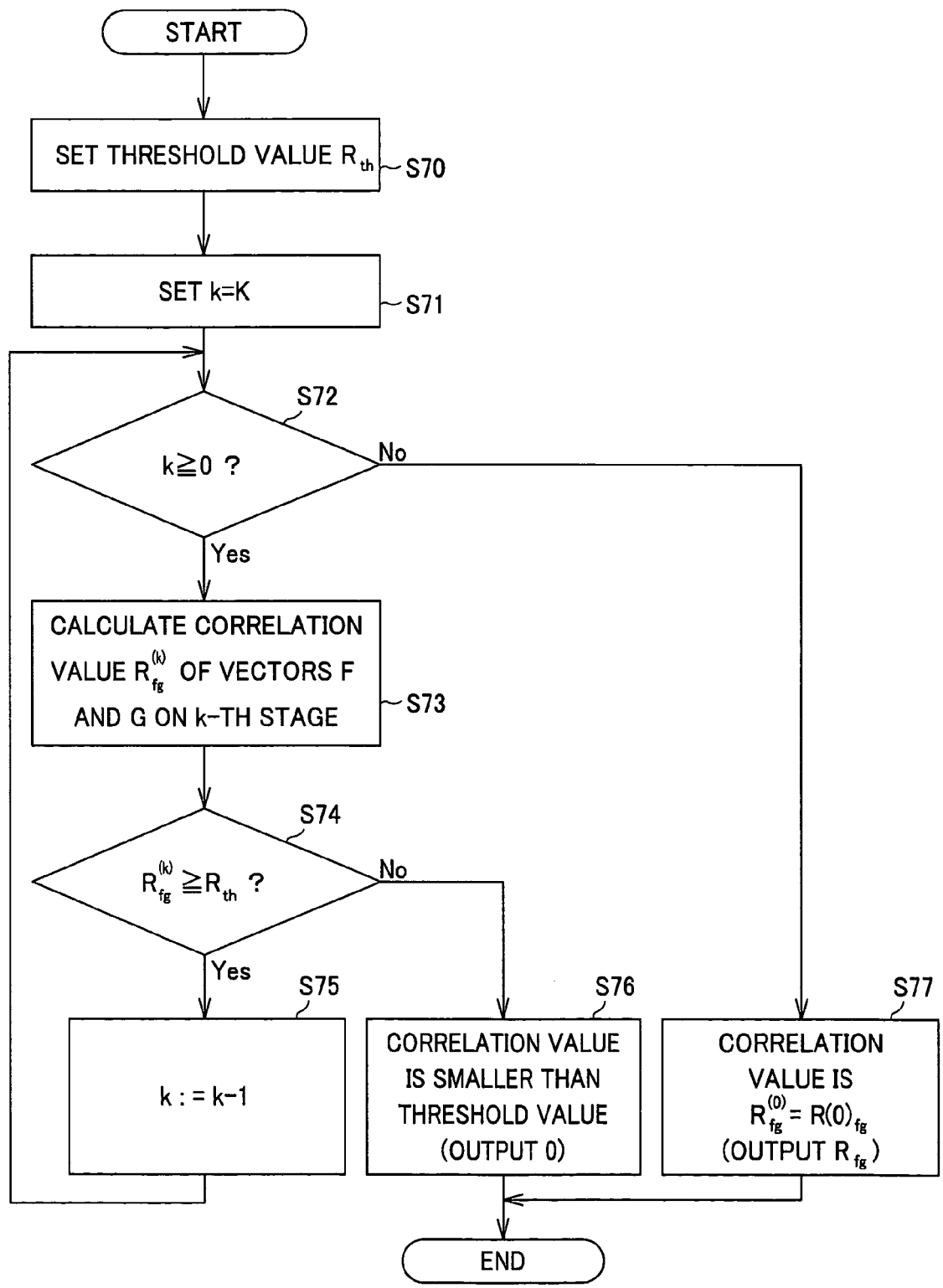
FIG. 16 is a flowchart for explaining an operation in a coincidence detecting unit in the signal recording/reproducing apparatus.

Hereinafter, the coincidence detection processing by the coincidence detecting unit 60 will be described in detail with reference to the flowchart of FIG. 16. In this coincidence detection processing, the correlation between a feature vector (if there are plural feature vectors, one of them is selected) of the bookmark and one recorded feature vector in the search range is hierarchically calculated and this correlation value is compared with a preset threshold value to detect whether these values are coincident or not. If the correlation value exceeds the threshold value, the correlation value is outputted. If the correlation value does not exceed the threshold value, 0 is outputted as a matter of convenience.

In the following description, a vector F is assumed to represent the video feature vector $V_{Book}$ or the audio feature vector $A_{Book}$ of the bookmark, and a vector G is assumed to represent the recorded video feature vector Vi or audio feature vector Ai.

First, at step S70, the threshold value $R_{th}$ of correlation indicating the above-described search accuracy is set. In this case, since the correlation value of a vector of a non-negative value is normalized between 0 and 1, this threshold value is set, for example, at 0.8.

Next, at step S71, the stage k of correlation is set to be K. In this manner, in accordance with the above-described hierarchical vector converting units 33, 34, the coincidence detecting unit 60 sequentially performs processing from the highest stage to the lowest stage where k decreases.

Next, at step S72, whether or not K is equal to or larger than 0 is judged. If K is equal to or larger than 0 (Yes), the processing goes to step S73. If K is less than 0, the processing goes to step S77.

At step S73, the correlation of the k-th stage is calculated, as expressed by the following equation (6). The correlation value $R^{(k)}_{fg}$ of the k-th stage is found.

$$R^{(k)}_{fg} = \frac{\sum_{n=0}^{2^{K-k}-1} F[n]G[n]}{\sqrt{\sum_{n=0}^{2^{K-k}-1} F^2[n] \sum_{n=0}^{2^{K-k}-1} G^2[n]}} \qquad (6)$$

$$= \frac{\sum_{n=0}^{2^{K-k}-1} f^{(k)}[n]g^{(k)}[n]}{\sqrt{\sum_{n=0}^{2^{K-k}-1} (f^{(k)}[n])^2 \sum_{n=0}^{2^{K-k}-1} (g^{(k)}[n])^2}}$$

This equation (6) is to calculate the correlation value using the $0^{th}$ to $(2^k-1)$th of the converted vectors F and vectors G.

At step S74, whether or not the correlation value $R^{(k)}_{fg}$ of the k-th stage is equal to or larger than the threshold value $R_{th}$ is judged. If the correlation value $R^{(k)}_{fg}$ is smaller than the threshold value $R_{th}$ (No), the notification that the correlation is smaller than the threshold (=0) is outputted at step S76 and the processing ends. On the other hand, if the correlation value $R^{(k)}_{fg}$ is equal to or larger than the threshold value $R_{th}$ (Yes), k is decreased by 1 at step S75 and the processing returns to step S72 to calculate the correlation value of the next stage.

If the processing is performed up to the $0^{th}$ stage and the correlation value $R^{(k)}_{fg}$ is larger than the threshold value $R_{th}$, the correlation value $R_{fg}$ ($=R^{(0)}_{fg}$) is outputted at step S77 and the processing ends.

Figure 17:
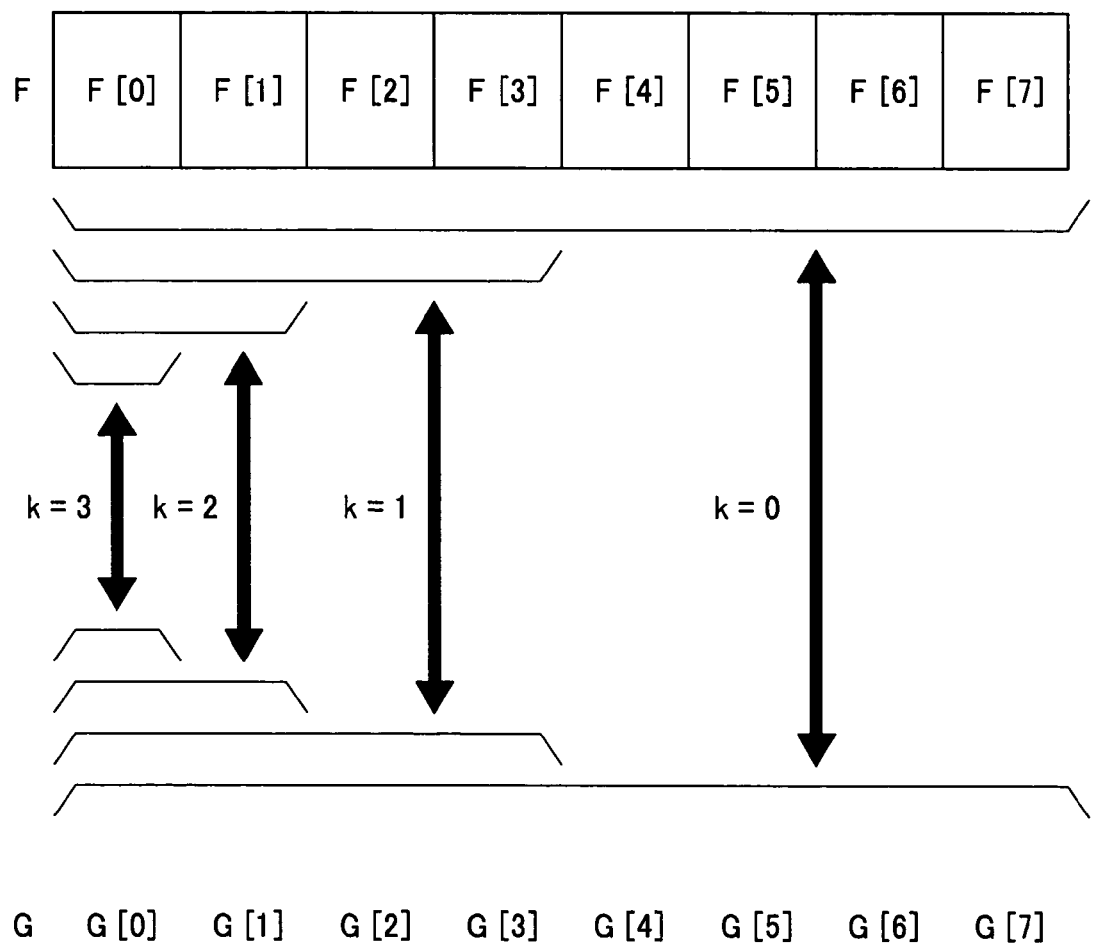
FIG. 17 is a view for explaining a specific operation in the coincidence detecting unit.

As an example, FIG. 17 shows specific calculation in the case of $N=8=2^3$. On the third stage (k=3) of the calculation, the correlation of the first elements (F[0] and G[0]) is calculated to find the correlation value $R^{(3)}_{fg}$. If the correlation value $R^{(3)}_{fg}$ is equal to or larger than the threshold value $R_{th}$, the processing goes to the second stage.

On the second stage, the correlation of the first and second elements (F[0], F[1] and G[0], G[1]) is calculated. In this case, the result of the product-sum calculation on the first stage is used for the product-sum calculation of the above-described equation (6). Specifically, in the numerator of the equation (6), the sum of F[0]G[0] and F[1]G[1] is calculated, and the value calculated on the first stage is used for F[0]G[0]. In the denominator of the equation (6), for example, the sum of $F^2[0]$ and $F^2[1]$ is calculated, and the value calculated on the first stage is used for $F^2[0]$.

Moreover, on the first stage the correlation of the first to fourth elements (F[0] to F[3] and G[0] to G[3]) is calculated. Furthermore, on the $0^{th}$ stage, the correlation of the first to eighth elements (F[0] to F[7] and G[0] to G[7]) is calculated. Also in this case, the result of the product-sum calculation on the previous stage is used for the product-sum calculation of the equation (6). If the correlation value becomes less than the threshold value at an intermediate stage, the calculation is ended at that point and 0 is outputted. If the correlation value exceeds the threshold value on all the stages, the correlation value $R_{fg}$ ($=R^{(0)}_{fg}$) is outputted. In the above-described coincidence detection processing, if the correlation value exceeds the predetermined threshold value, that correlation value is outputted, and if the correlation value is less than the predetermined threshold value, 0 is outputted.

As described above, in this invention, when recording a video signal/audio signal, its feature vector is recorded together, and when the recorded video signal/audio signal is reproduced, feature vectors near a position designated by the user are registered as so-called bookmarks. As the user designated one of the bookmarks, the correlation value between the feature vector of that bookmark and the recorded feature vector is calculated and the correlation value is compared with a threshold value. This enables the user to easily search for and reproduce a video signal/audio signal.

Moreover, calculation to hierarchically dull the feature vectors is performed before they are recorded. In coincidence detection, only when the correlation value of the dull vectors is equal to or larger than a predetermined threshold value, the correlation of feature vectors that is more detailed by one stage is calculated. As for a correlation value less than the predetermined threshold value, it is detected that the correlation value is less than the threshold value, and calculation of the actual correlation value is omitted. Thus, high-speed calculation of correlation can be realized.

More specifically, the hierarchical conversion of the feature vector is orthogonal wavelet transform using the Harr basis. The hierarchical calculation of correlation starts at the wavelet coefficient of the lowest-frequency component, and the correlation is calculated while the vector is sequentially expanded to include the wavelet coefficient of a high-frequency component.

In short, the characteristic that the correlation value of a low-frequency component of a non-negative signal is generally higher than the correlation value of a signal including a high-frequency component, and the characteristic that the correlation value is saved by orthogonal transform, are utilized. By hierarchical calculating the correlation value of a wavelet-transformed feature vector while expanding the frequency range from the lowest-frequency component, and then stopping the calculation of correlation when the correlation value becomes lower than a predetermined threshold, it is possible to realize high-speed calculation of correlation. By using the Harr basis as a kernel function of wavelet transform, it is possible to detect almost all the correlation values exceeding the threshold.

Particularly in the case of detecting a feature vector substantially coincident with the feature vector of the bookmark from a large number of recorded feature vectors, since most of the feature vectors are not coincident and do not exceed the threshold value, the calculation of correlation can be stopped early and the detection time can be significantly reduced.

FIGS. 18A to 18E show typical broadcasting patterns in broadcasting a program. Of these, FIGS. 18A to 18D show typical broadcasting patterns for a commercial broadcasting program. Specifically, in the pattern of FIG. 18A, the opening music/image starts at the scheduled program start time, followed by notification of the sponsor(s) and commercial message(s) (hereinafter simply referred to as commercial), and then the main part of the program starts. In the pattern of FIG. 18B, the program does not start at the scheduled program start time. After several commercials are broadcast, the opening music/image starts, followed by notification of the sponsor (s), commercial(s), and the main part of the program. In the pattern of FIG. 18C, the main part of the program starts at the scheduled program start time. Normally, a summary of the program of the previous broadcast and an introduction of the program of this time are broadcast, followed by the opening music/image, notification of the sponsor(s) and commercial (s), and then the main part of the program is resumed. In the pattern of FIG. 18D, the main part of the program does not start at the scheduled program start time. After several commercials are broadcast, the main part of the program is broadcast. Then, the opening music/image, notification of the sponsor(s) and commercial(s) are broadcast, and the main part of the program is resumed. FIG. 18E shows a typical broadcasting pattern at a broadcasting station that broadcasts no commercial messages or in program editing without having a commercial message. In this case, since no commercial messages are broadcast, the opening music/image or the main part of the program starts at the scheduled program start time.

Now, registration of opening music/image as common image/music in each broadcast of a program that is broadcast in series by using the above-described technique will be considered. In the pattern of FIGS. 18A and 18B, this does not cause any serious problem because reproduction is started at a halfway part of the opening music. However, in the patterns of FIGS. 18C to 18E, since the main part of the program is partly broadcast before the opening image/music, the user cannot view/listen to this part. Although the user can search for the beginning of the target part while performing manual rewind playback, it will be a burden on the user. Thus, in the following second embodiment, a technique for solving such a problem will be described.

Figure 19:
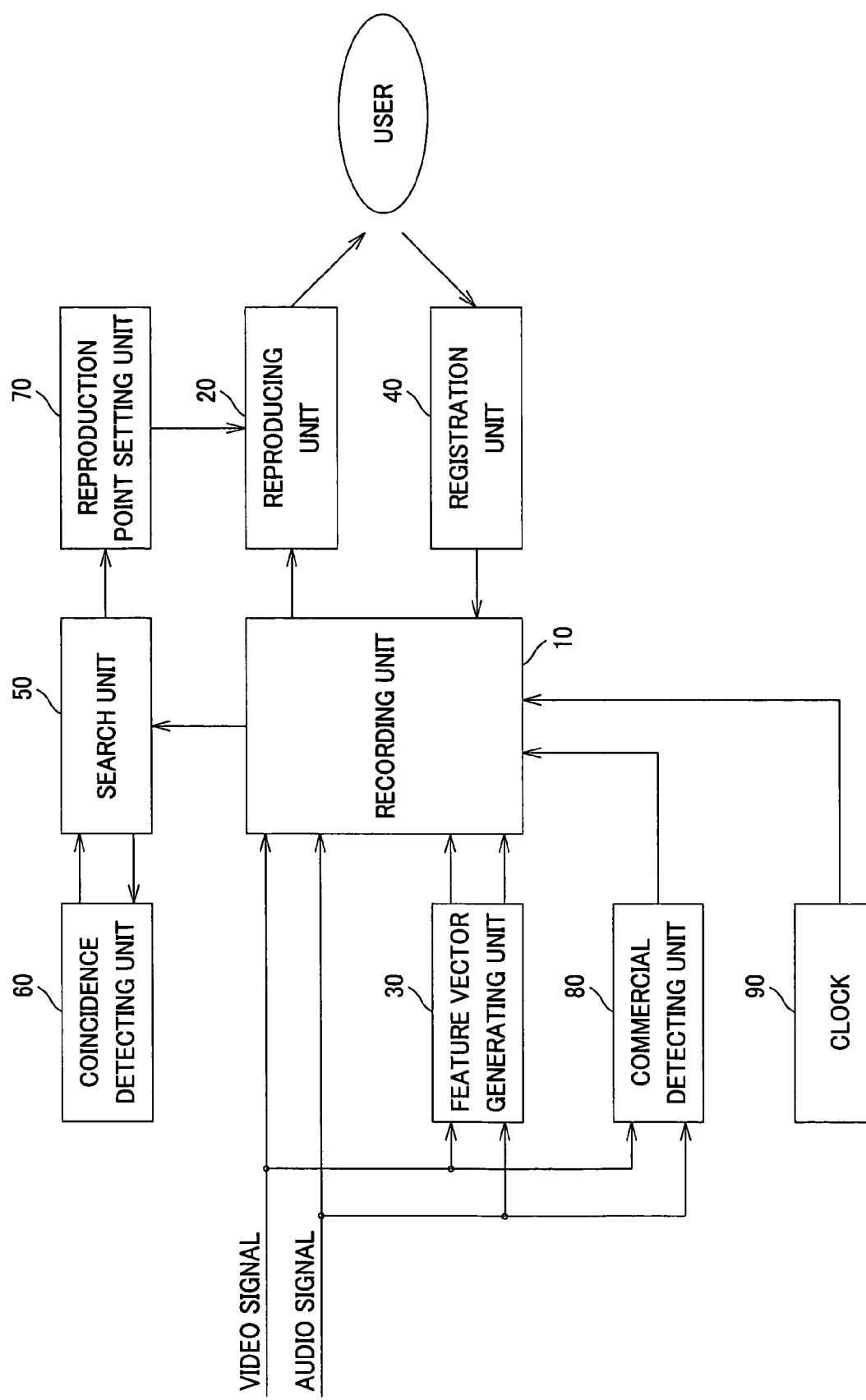
FIG. 19 is a block diagram showing a schematic structure of another example of the signal recording/reproducing apparatus according to this invention.

A signal recording/reproducing apparatus 2 shown in FIG. 19 as the second embodiment of this invention has the same basic structure as the signal recording/reproducing apparatus 1 shown in FIG. 1, but is characterized in that it has a commercial detecting unit 80 and a clock 90. Therefore, the same constituent elements as those of the signal recording/reproducing apparatus 1 shown in FIG. 1 are denoted by the same numerals and will not be described further in detail.

Figure 20:
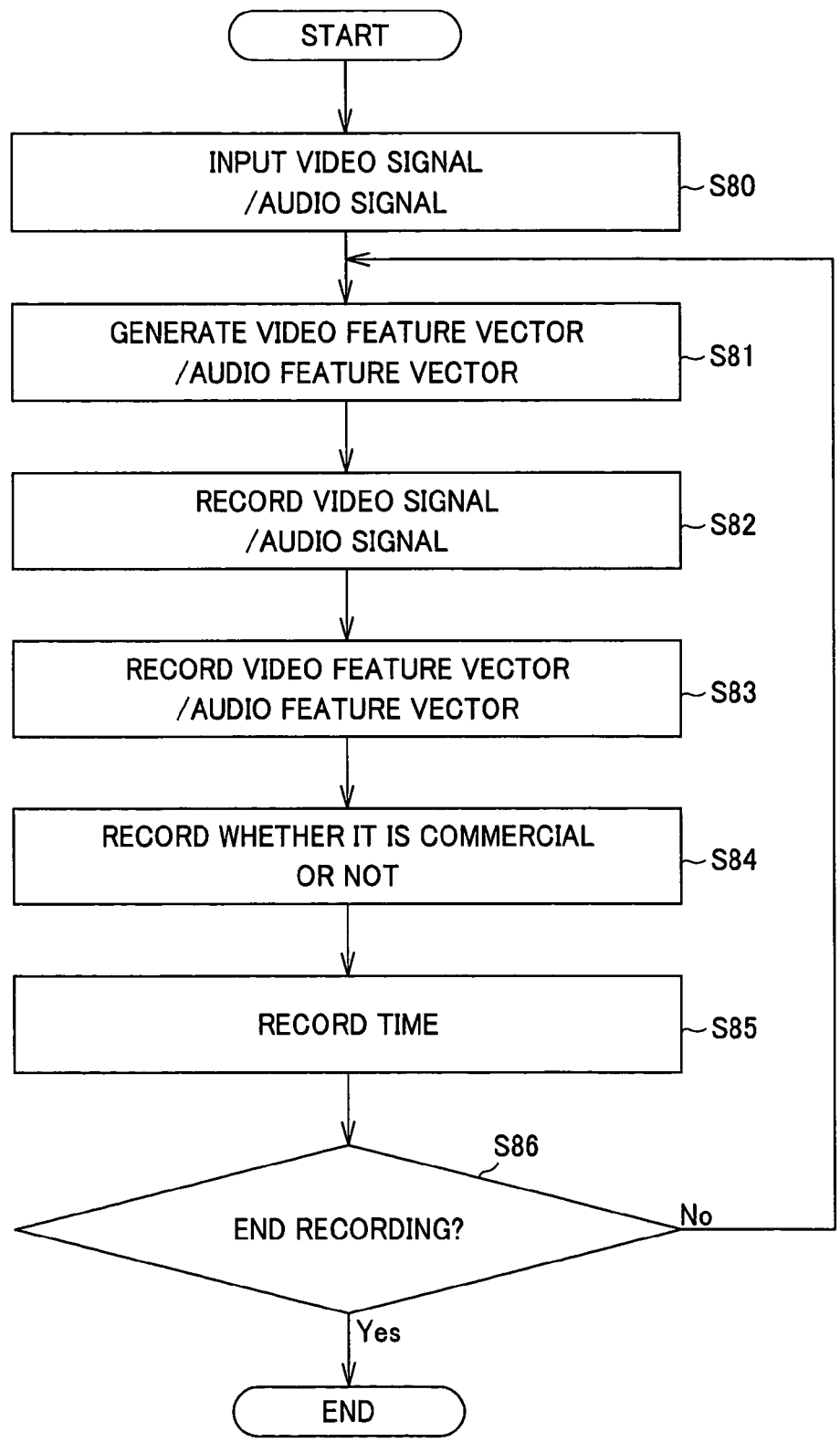
FIG. 20 is a flowchart for explaining an operation in recording processing in the signal recording/reproducing apparatus shown in FIG. 19.

First, the operations of individual units in recording processing in this signal recording/reproducing apparatus 2 will be described with reference to the flowchart of FIG. 20. At step S80, a feature vector generating unit 30 input a video signal/audio signal from a tuning/demodulating device or the like, not shown. At the next step S81, the feature vector generating unit 30 generates a video feature vector and an audio feature vector in a manner which will be described later.

Next, at step S82, the video signal/audio signal is recorded into a recording unit 10. At step S83, the video feature vector and the audio feature vector are recorded into the recording unit 10.

Next, at step S84, the commercial detecting unit 80 detects whether or not the video signal/audio signal is of a commercial part. If it is of a commercial part, its position is recorded into the recording unit 10. In this specification, a commercial includes a program guide or the like, for example, of a broadcasting station that does not broadcast commercial messages or in a program editing having no commercial messages.

At step S85, time information provided from the clock 90 is recorded into the recording unit 10.

At step S86, whether the recording should be ended or not is judged. If the recording is not to be ended (No) at step S86, the processing returns to step S80 to continue the recording processing. If a recording end instruction is given by the user's operation or timer operation (Yes), the recording processing is ended.

In short, in the recording processing in the signal recording/reproducing apparatus 2, the commercial position and time information are recorded to the recording unit 10 together with the video signal/audio signal and the video feature vector/audio feature vector.

As a technique of commercial detection, the technique described in the specification and drawings of the Japanese Patent Application No.2000-127658, already filed by the present applicant can be used. The following is the summary of this technique.

In Japan, almost all commercial messages are produced with a length of 15 seconds, 30 seconds or 60 seconds, except for some special cases. Since lowering of the audio level and switching of video signals necessarily occur before and after each commercial, these are considered to be "essential conditions" of detection. A feature presenting a predetermined tendency as a result of producing a commercial on the basis of standards, to realize a good advertising effect in a short time, and in consideration of program construction, is considered to be an "additional condition". Moreover, a condition that sections meeting the additional condition overlap each other, at least one of these sections cannot be a correct commercial section, is considered as a "logical condition". Commercial candidates are deterministically extracted on the basis of the "essential conditions". Candidates are selected by statistical evaluation of commercial likelihood based on the "additional condition". The overlapping of the candidates is solved by the "logical condition". Thus, a commercial can be detected accurately.

In the case where a broadcasting mode can be utilized, the technique described in, for example, JP-A-3-158086 and JP-A-3-2622872 can be used. Specifically, in Japan, most commercial messages are stereo-broadcast and a pilot signal indicating the audio mode, that is, monaural mode, stereo mode or audio multiplexed mode, is multiplexed to a television broadcast signal. Therefore, for example, in the case of recording the main part of a program with the monaural mode or the audio multiplexed mode, a commercial section can be detected by detecting a stereo-mode section.

Next, reproduction/registration processing is performed. This processing is similar to the processing in the above-described first embodiment. That is, the recorded video signal/audio signal is reproduced, and from this signal, a video signal/audio signal near a position designated by the user and a video feature vector/audio feature vector are cut out and registered as a so-called bookmark.

Figure 21:
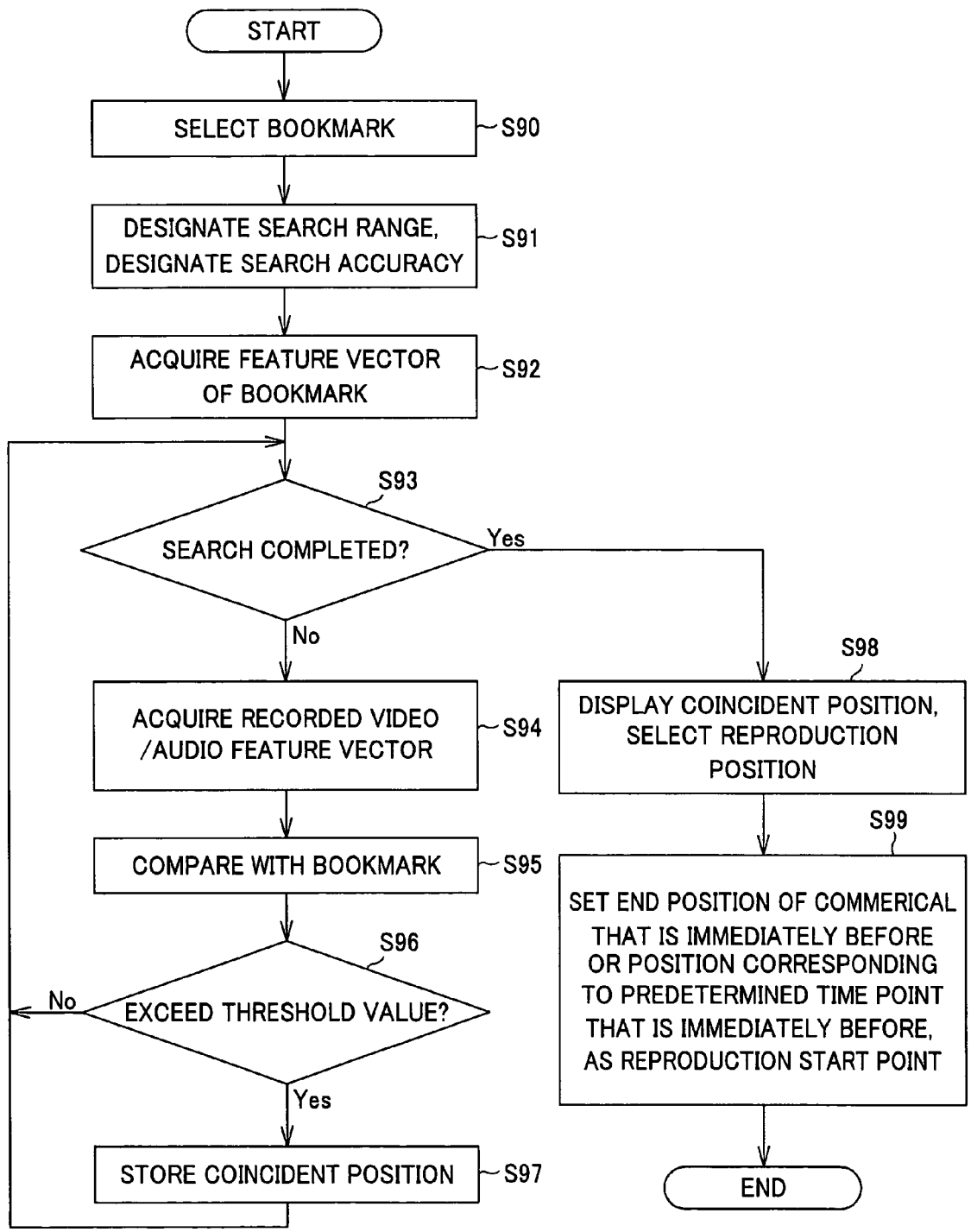
FIG. 21 is a flowchart for explaining an operation in search processing in the signal recording/reproducing apparatus shown in FIG. 19.

The operations in individual units in search processing in the signal recording/reproducing apparatus 2 will now be described with reference to the flowchart of FIG. 21. When a search instruction is given from the user through a user interface, not shown, first at step S90, a search unit 50 receives selection of a registered bookmark from the user. If only one bookmark is registered, or if search is to be performed with respect to all the registered bookmarks, or if the priority of bookmarks is set in advance, this step may be omitted.

Next, at step S91, the search unit 50 receives, from the user, designation of a search range indicating which part of the recorded video signal/audio signal is to be searched, and designation of search accuracy indicating the degree of difference that can be recognized as coincident. If the search range and the search accuracy are set in advance, this step may be omitted.

Next, at step S92, the search unit 50 acquires a feature vector of the designated bookmark from the recording unit 10. Also in this case, if plural video feature vectors Vi and audio feature vectors Ai are registered with one bookmark, the following operation is sequentially carried out for each of these vectors, as in the first embodiment.

At step S93, the search unit 50 judges whether or not the search in the designated search range has been completed. If the search has not been completed (No) at step S93, the processing goes to step S94. If the search has been completed (Yes), the processing goes to step S98.

At step S94, the search unit 50 acquires one recorded feature vector in the search range.

Next, at step S95, a coincidence detecting unit 60 compares the feature vector with the feature vector of the bookmark and calculates a correlation value between them in a manner which will be described later. At step S96, the coincidence detecting unit 60 judges whether or not the correlation value exceeds a preset threshold value. If the correlation value does not exceed the threshold value (No) at step S96, the processing returns to step S93 and comparison with another feature vector is repeated. If the correlation value exceeds the threshold value (Yes) at step S96, it is determined that the feature vectors are coincident and that position is stored at step S97. After that, the processing returns to step S93 and comparison with another feature vector is repeated.

At step S98, the stored coincident position is displayed, and a reproduction point setting unit 70 receives designation of the position where reproduction should be started, from the user, and starts reproduction. If only one coincident position exists or if the priority of reproduction is predetermined, step S98 may be omitted. If there is no coincident position, the absence of coincident position is displayed and reproduction is not carried out.

At step S99, the reproduction point setting unit 70 sets an end position of a commercial that is immediately before or a position corresponding to a predetermined time point, with respect to the coincident position, and then the search processing ends. It is also possible to check the time of both of these positions and set the position closer to the coincident position. Then a reproducing unit 20 starts reproduction at this set position.

As the above-described predetermined time point, the scheduled start time of the corresponding program acquired in advance from an electronic program guide or the like can be set. If there is no electronic program guide or the like, a convenient time point such as the $0^{th}$ minute, $15^{th}$ minute or $30^{th}$ minute of every hour can be set.

As an example, FIG. 22 schematically shows a reproduction position in the above-described patterns of FIGS. 18D and 18E. Even in the case where a position tp where an index i indicating discrete time at an intermediate part of opening image/music is a coincident position as described above, for example, in the pattern of FIG. 18D, the user can view the program form the beginning by starting reproduction at the end position tq of the commercial that is immediately before, as shown in FIG. 22B. In the pattern of FIG. 18E, the user can view the program from the beginning by starting reproduction at the scheduled program start time tr based on the electronic program guide or the like, as shown in FIG. 22C.

This technique of searching for the beginning of a target part is not limited to the case of setting a reproduction point and can be broadly used, for example, for designating a bookmark position. For example, in the case of appending a bookmark to the beginning of a program, even though the main part of the program starts during reproduction, the user can instantaneously search for the beginning without repeating fast-forward/rewind for alignment around the beginning position.

This invention is described above with reference to the first embodiment and the second embodiment. According to the signal recording/reproducing apparatuses 1, 2 of this invention, when recording a video signal/audio signal, its feature vector is recorded, too, and when reproducing the recorded video signal/audio signal, feature vectors near a position designated by the user is registered as so-called bookmarks. Thus, the user can quickly search for and reproduce a part including a desired video signal/audio signal, by designating one of the bookmarks.

Moreover, as described in the second embodiment of this invention, as the position and time of a commercial is recorded in advance, the user can view a program from the beginning as a result of search for the beginning.

This invention is not limited to above-described embodiments, and various modifications can be made without departing from the scope of this invention.

For example, while both video signal and audio signal are used in the above-described embodiments, this invention is not limited to this, and a similar effect can be realized by using either a video signal or an audio signal, for example, using only an audio signal for radio broadcast.

Moreover, though a broadcast program is used in the above-described embodiments, this invention is not limited to this, and a similar effect can be realized by applying this invention to non-broadcast video/audio signals such as those in a movie, a video tape or DVD (digital versatile disk) for sale.

While feature extraction is performed at the time of recording a video signal/audio signal in the above-described embodiments, this invention is not limited to this, and it is possible to perform feature extraction at the time of bookmark registration or search. Thus, since it suffices to record only a video signal/audio signal at the time of recording, this invention can also be applied, for example, to already recorded video and audio signals. However, the operation time required for search increases.

Moreover, a hardware structure is used in the above-described embodiments, this invention is not limited to this, and the processing in the signal recording/reproducing apparatuses 1, 2 can be realized by causing a CPU (central processing unit) to a computer program. In this case, the computer program can be provided in the form of being recorded on a recording medium, or transmitted via the Internet or other transmission media.

It should be understood by those ordinarily skilled in the art that the invention is not limited to those embodiments, but various modifications, alternative constructions or equivalents can be implemented without departing from the scope and spirit of the present invention as set forth and defined by the appended claims.

INDUSTRIAL APPLICABILITY

As described above, in the signal recording/reproducing apparatus according to this invention, when recording a video signal and/or an audio signal, also its feature vector is recorded, and when reproducing the recorded video signal and/or audio signal, for example, a feature vector corresponding to a signal position designated by the user is registered. Then, a feature vector having a correlation value exceeding a predetermined threshold value with respect to at least one of the registered features vectors is detected from the feature vector recorded in recording means. A reproduction point is set on the basis of the detected feature vector and the video signal and/or the audio signal is reproduced from the reproduction point. Therefore, by designating one of the registered feature vectors, the user can quickly search for and reproduce a part including a desired video signal and/or audio signal.

In the signal recording/reproducing method according to this invention, when recording a video signal and/or an audio signal, also its feature vector is recorded, and when reproducing the recorded video signal and/or audio signal, for example, a feature vector corresponding to a signal position designated by the user is registered. Then, a feature vector having a correlation value exceeding a predetermined threshold value with respect to at least one of the registered features vectors is detected from the feature vector recorded in recording means. A reproduction point is set on the basis of the detected feature vector and the video signal and/or the audio signal is reproduced from the reproduction point. Therefore, by designating one of the registered feature vectors, the user can quickly search for and reproduce a part including a desired video signal and/or audio signal.

The program according to this invention causes a computer to execute the above-described signal recording/reproduction processing. The recording medium according to this invention is a computer-readable recording medium having such a program recorded thereon.

With these program and recording medium, the above-described signal recording/reproduction processing can be realized by software.

In the signal reproducing apparatus according to this invention, when a reproduction start position of a reproduced video signal and/or audio signal is designated, a position temporally preceding the designated position is set as a reproduction start point, for example, an end position of a commercial message temporally preceding the designated position is set as a reproduction start point in the case where commercial message detection means is provided, or a start time of a program including the designated position or the $0^{th}$ minute of every hour, the 15th minute of every hour or the $30^{th}$ minutes of every hour is set as a reproduction start point in the case where time detection means is provided. Reproduction of the video signal and/or the audio signal is started at the reproduction start point. Therefore, the user can view the program from the beginning as a result of search for the beginning of the video signal and/or the audio signal.

In the signal reproducing method according to this invention, when a reproduction start position of a reproduced video signal and/or audio signal is designated, a position temporally preceding the designated position is set as a reproduction start point, for example, an end position of a commercial message temporally preceding the designated position is set as a reproduction start point in the case where a commercial message detection step is provided, or a start time of a program including the designated position or the $0^{th}$ minute of every hour, the 15th minute of every hour or the $30^{th}$ minutes of every hour is set as a reproduction start point in the case where a time detection step is provided. Reproduction of the video signal and/or the audio signal is started at the reproduction start point. Therefore, the user can view the program from the beginning as a result of search for the beginning of the video signal and/or the audio signal.

The invention claimed is:

1. A signal recording/reproducing apparatus comprising:
   a feature vector generation unit for extracting a feature quantity from a video signal and/or an audio signal and forming its vector to generate a feature vector;
   a recording unit for recording the video signal and/or the audio signal and the feature vector generated by the feature vector generation unit;
   a registration unit for registering at least a part of the feature vectors recorded in the recording unit;
   a coincidence detection unit for detecting a feature vector substantially coincident with at least one of feature vectors registered by the registration unit, from the feature vector recorded in the recording unit;
   a reproduction point setting unit for setting a reproduction start point based on the detected feature vector; and
   a reproduction unit for reproducing the video signal and/or the audio signal from the reproduction start point set by the reproduction point setting unit.

2. The signal recording/reproducing apparatus as claimed in claim 1, wherein the feature vector is a time series of a vector formed from a pixel value of an average image of at least one frame within a predetermined time interval of the video signal, or a time series of a vector formed from a pixel value of a small image formed by dividing the average image by predetermined block.

3. The signal recording/reproducing apparatus as claimed in claim 1, wherein the feature vector is a time series of a vector formed from a short-time power spectrum of the audio signal.

4. The signal recording/reproducing apparatus as claimed in claim 1, wherein when reproducing the video signal and/or the audio signal recorded in the recording unit, the registration unit registers the feature vector corresponding to a signal position designated by a user.

5. The signal recording/reproducing apparatus as claimed in claim 1, wherein when reproducing the video signal and/or the audio signal recorded in the recording unit, the registration unit registers the feature vector corresponding to a signal position preceding a signal position designated by a user by a predetermined period of time.

6. The signal recording/reproducing apparatus as claimed in claim 1, wherein the coincidence detection unit detects a feature vector having a correlation value exceeding a predetermined threshold value with respect to at least one of the registered feature vectors, from the feature vectors recorded in the recording unit.

7. The signal recording/reproducing apparatus as claimed in claim 1, further comprising hierarchical conversion unit for performing hierarchical conversion of the feature vector and generating a converted vector, wherein the recording unit records the video signal and/or the audio signal and the converted vector generated by the hierarchical conversion unit, and the registration unit registers at least a part of the converted vectors recorded in the recording unit.

8. The signal recording/reproducing apparatus as claimed in claim 7, wherein the hierarchical conversion unit performs hierarchical conversion that repeats processing to divide components of the feature vector into sum components and difference components with respect to adjacent components and then further divide the sum components into sum components and difference components with respect to adjacent components, thus generating the converted vector.

9. The signal recording/reproducing apparatus as claimed in claim 8, wherein the coincidence detection unit performs hierarchical calculation of correlation between at least one of the registered converted vectors and the converted vector recorded in the recording unit, and detects a feature vector having a correlation value exceeding a predetermined threshold value with respect to at least one of the registered converted vectors, from the converted vector recorded in the recording unit.

10. The signal recording/reproducing apparatus as claimed in claim 9, wherein the coincidence detection unit performs hierarchical calculation of correlation to calculation correlation by increasing the number of components so as to sequentially include difference components from sum components of an upper hierarchical level of the converted vector, and if a correlation value on an intermediate hierarchical level in the hierarchical calculation of correlation is lower than the threshold value, the coincidence detection unit does not perform further calculation of correlation.

11. A signal recording/reproducing method comprising:
a feature vector generation step of extracting a feature quantity from a video signal and/or an audio signal and forming its vector to generate a feature vector;
a recording step of recording the video signal and/or the audio signal and the feature vector generated at the feature vector generation step into recording unit;
a registration step of registering at least a part of the feature vectors recorded in the recording unit;
a coincidence detection step of detecting a feature vector substantially coincident with at least one of feature vectors registered at the registration step, from the feature vector recorded in the recording unit;
a reproduction point setting step of setting a reproduction start point based on the detected feature vector; and
a reproduction step of reproducing the video signal and/or the audio signal from the reproduction start point set at the reproduction point setting step.

12. The signal recording/reproducing method as claimed in claim 11, wherein at the registration step, when reproducing the video signal and/or the audio signal recorded in the recording unit, the feature vector corresponding to a signal position designated by a user is registered.

13. The signal recording/reproducing method as claimed in claim 11, wherein at the coincidence detection step, a feature vector having a correlation value exceeding a predetermined threshold value with respect to at least one of the registered feature vectors is detected from the feature vectors recorded in the recording unit.

14. The signal recording/reproducing method as claimed in claim 11, further comprising a hierarchical conversion step performing hierarchical conversion of the feature vector and generating a converted vector, wherein at the recording step, the video signal and/or the audio signal and the converted vector generated by the hierarchical conversion means are recorded into the recording unit, and at the registration step, at least a part of the converted vectors recorded in the recording unit is registered.

15. The signal recording/reproducing method as claimed in claim 14, wherein at the hierarchical conversion step, hierarchical conversion that repeats processing to divide components of the feature vector into sum components and difference components with respect to adjacent components and then further divide the sum components into sum components and difference components with respect to adjacent components is performed, thus generating the converted vector.

16. The signal recording/reproducing method as claimed in claim 15, wherein at the coincidence detection step, hierarchical calculation of correlation between at least one of the registered converted vectors and the converted vector recorded in the recording means is performed, and a feature vector having a correlation value exceeding a predetermined threshold value with respect to at least one of the registered converted vectors is detected from the converted vector recorded in the recording unit.

17. The signal recording/reproducing method as claimed in claim 16, wherein at the coincidence detection step, hierarchical calculation of correlation to calculation correlation by increasing the number of components so as to sequentially include difference components from sum components of an upper hierarchical level of the converted vector is performed, and if a correlation value on an intermediate hierarchical level in the hierarchical calculation of correlation is lower than the threshold value, no further calculation of correlation is performed.

18. A program computer readable recording medium comprising instructions which when executed by a computer system causes the computer to implement a programmed method, the programmed method comprising:
a feature vector generation step of extracting a feature quantity from a video signal and/or an audio signal and forming its vector to generate a feature vector;
a recording step of recording the video signal and/or the audio signal and the feature vector generated at the feature vector generation step into recording unit;
a registration step of registering at least a part of the feature vectors recorded in the recording unit;

a coincidence detection step of detecting a feature vector substantially coincident with at least one of feature vectors registered at the registration step, from the feature vector recorded in the recording unit;

a reproduction point setting step of setting a reproduction start point based on the detected feature vector; and a reproduction step of reproducing the video signal and/or the audio signal from the reproduction start point set at the reproduction point setting step.

19. The computer storage readable medium as claimed in claim 18, wherein at the registration step, when reproducing the video signal and/or the audio signal recorded in the recording unit, the feature vector corresponding to a signal position designated by a user is registered.

20. The computer readable recording medium as claimed in claim 18, wherein at the coincidence detection step, a feature vector having a correlation value exceeding a predetermined threshold value with respect to at least one of the registered feature vectors is detected from the feature vectors recorded in the recording unit.

21. The computer readable recording medium as claimed in claim 18, further comprising a hierarchical conversion step performing hierarchical conversion of the feature vector and generating a converted vector, wherein at the recording step, the video signal and/or the audio signal and the converted vector generated by the hierarchical conversion unit are recorded into the recording unit, and at the registration step, at least a part of the converted vectors recorded in the recording means unit is registered.

22. The computer readable recording medium as claimed in claim 21, wherein at the hierarchical conversion step, hierarchical conversion that repeats processing to divide components of the feature vector into sum components and difference components with respect to adjacent components and then further divide the sum components into sum components and difference components with respect to adjacent components is performed, thus generating the converted vector.

23. The computer readable recording medium as claimed in claim 22, wherein at the coincidence detection step, hierarchical calculation of correlation between at least one of the registered converted vectors and the converted vector recorded in the recording unit is performed, and a feature vector having a correlation value exceeding a predetermined threshold value with respect to at least one of the registered converted vectors is detected from the converted vector recorded in the recording means unit.

24. The computer readable recording medium as claimed in claim 23, wherein at the coincidence detection step, hierarchical calculation of correlation to calculation correlation by increasing the number of components so as to sequentially include difference components from sum components of an upper hierarchical level of the converted vector is performed, and if a correlation value on an intermediate hierarchical level in the hierarchical calculation of correlation is lower than the threshold value, no further calculation of correlation is performed.

25. A computer readable recording medium comprising instructions which when executed by a computer system causes the computer to implement a programmed method, the programmed method, comprising:

a feature vector generation step of extracting a feature quantity from a video signal and/or an audio signal and forming its vector to generate a feature vector;

a recording step of recording the video signal and/or the audio signal and the feature vector generated at the feature vector generation step into a recording unit;

a registration step of registering at least a part of the feature vectors recorded in the recording unit;

a coincidence detection step of detecting a feature vector substantially coincident with at least one of feature vectors registered at the registration step, from the feature vector recorded in the recording unit;

a reproduction point setting step of setting a reproduction start point based on the detected feature vector; and a reproduction step of reproducing the video signal and/or the audio signal from the reproduction start point set at the reproduction point setting step.

26. The computer readable recording medium as claimed in claim 25, wherein at the registration step, when reproducing the video signal and/or the audio signal recorded in the recording unit, the feature vector corresponding to a signal position designated by a user is registered.

27. The computer readable recording medium as claimed in claim 25, wherein at the coincidence detection step, a feature vector having a correlation value exceeding a predetermined threshold value with respect to at least one of the registered feature vectors is detected from the feature vectors recorded in the recording unit.

28. The computer readable recording medium as claimed in claim 25, further comprising a hierarchical conversion step performing hierarchical conversion of the feature vector and generating a converted vector, wherein at the recording step, the video signal and/or the audio signal and the converted vector generated by the hierarchical conversion unit are recorded into the recording unit, and at the registration step, at least a part of the converted vectors recorded in the recording unit is registered.

29. The computer readable recording medium as claimed in claim 28, wherein at the hierarchical conversion step, hierarchical conversion that repeats processing to divide components of the feature vector into sum components and difference components with respect to adjacent components and then further divide the sum components into sum components and difference components with respect to adjacent components is performed, thus generating the converted vector.

30. The computer readable recording medium as claimed in claim 29, wherein at the coincidence detection step, hierarchical calculation of correlation between at least one of the registered converted vectors and the converted vector recorded in the recording unit is performed, and a feature vector having a correlation value exceeding a predetermined threshold value with respect to at least one of the registered converted vectors is detected from the converted vector recorded in the recording unit.

31. The computer readable recording medium as claimed in claim 30, wherein at the coincidence detection step, hierarchical calculation of correlation to calculation correlation by increasing the number of components so as to sequentially include difference components from sum components of an upper hierarchical level of the converted vector is performed, and if a correlation value on an intermediate hierarchical level in the hierarchical calculation of correlation is lower than the threshold value, no further calculation of correlation is performed.

* * * * *